United States Patent
Lee et al.

(10) Patent No.: US 12,356,339 B2
(45) Date of Patent: Jul. 8, 2025

(54) DEVICE OPERATING IN WIRELESS COMMUNICATION SYSTEM AND OPERATION METHOD THEREFOR

(71) Applicant: LG Electronics Inc., Seoul (KR)

(72) Inventors: Jeongsu Lee, Seoul (KR); Hyunsu Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 17/917,833

(22) PCT Filed: Apr. 9, 2021

(86) PCT No.: PCT/KR2021/004476
§ 371 (c)(1),
(2) Date: Oct. 7, 2022

(87) PCT Pub. No.: WO2021/206499
PCT Pub. Date: Oct. 14, 2021

(65) Prior Publication Data
US 2023/0164702 A1      May 25, 2023

(30) Foreign Application Priority Data

Apr. 9, 2020   (KR) .......................... 10-2020-0043414

(51) Int. Cl.
| H04W 52/28 | (2009.01) |
| H04L 5/00  | (2006.01) |
| H04W 52/32 | (2009.01) |
| H04W 52/36 | (2009.01) |

(52) U.S. Cl.
CPC ......... *H04W 52/281* (2013.01); *H04L 5/0048* (2013.01); *H04W 52/325* (2013.01); *H04W 52/367* (2013.01)

(58) Field of Classification Search
CPC ............. H04W 52/281; H04W 52/325; H04W 52/367; H04L 5/0048
USPC ........................................................ 455/522
See application file for complete search history.

(56) References Cited

U.S. PATENT DOCUMENTS

| 2011/0026419 A1* | 2/2011 | Kim .................... H04W 52/281 |
| | | 370/252 |
| 2016/0338050 A1* | 11/2016 | Kim ........................ H04W 4/70 |

FOREIGN PATENT DOCUMENTS

WO     WO 2010/005239       1/2010

OTHER PUBLICATIONS

Ericsson, "Outcome of email thread [100e-NR-Pos-ULRS-02]," R1-2001287, 3GPP TSG-RAN WG1, Meeting #100-e, Online, Feb. 24-Mar. 6, 2020, 11 pages.

Huawei, HiSilicon, "[Offline-611][POS] Summary on support of non-periodic SRS cases," R2-2001935, 3GPP TSG-RAN WG2, Meeting #109-e, Online, Feb. 24-Mar. 6, 2020, 13 pages.

(Continued)

*Primary Examiner* — April G Gonzales
(74) *Attorney, Agent, or Firm* — Fish & Richardson P.C.

(57) ABSTRACT

Various embodiments relate to a next generation wireless communication system for supporting a higher data transfer rate and the like beyond the 4$^{th}$ generation (4G) wireless communication system. According to various embodiments, a device operating in a wireless communication system and an operation method therefor may be provided, and various other embodiments may also be provided.

13 Claims, 25 Drawing Sheets

(56) References Cited

OTHER PUBLICATIONS

Office Action in Korean Appln. No. 10-2022-7034615, mailed on Mar. 14, 2024, 10 pages (with English translation).
International Search Report in International Appln. No. PCT/KR2021/004476, mailed on Jul. 19, 2021, 5 pages (with English translation).
Oppo, "Remaining Issues on UL Positioning Reference Signal," R1-2000463, Presented at 3GPP TSG RAN WG1 #100, e-Meeting, Feb. 24-Mar. 6, 2020, 4 pages.
Qualcomm Incorporated, "DL and UL NR Positioning Procedures," R2-1913395, Presented at 3GPP TSG-RAN WG2 Meeting #107bis, Chongqing, China, Oct. 14-18, 2019, 53 pages.

* cited by examiner (a)

(b)

DEVICE OPERATING IN WIRELESS COMMUNICATION SYSTEM AND OPERATION METHOD THEREFOR

CROSS-REFERENCE TO RELATED APPLICATIONS

This application is a National Stage application under 35 U.S.C. § 371 of International Application No. PCT/KR2021/004476, filed on Apr. 9, 2021, which claims the benefit of Korean Application No. 10-2020-0043414, filed on Apr. 9, 2020. The disclosures of the prior applications are incorporated by reference in their entirety.

TECHNICAL FIELD

Various embodiments relate to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

Various embodiments may provide a device operating in a wireless communication system and an operation method therefor.

Various embodiments may provide a method related to a power priority rule according to introduction of a positioning SRS and a device for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Various embodiments may provide a device operating in a wireless communication system and an operation method therefor.

According to various embodiments, a method performed by an apparatus in a wireless communication system may be provided.

According to various embodiments, the method may include obtaining a comparison result between a total transmit power of uplink (UL) transmissions and a maximum transmit power of the UE, and based on the comparison result, allocating a transmit power to the UL transmissions according to a first predefined priority.

According to various embodiments, the UL transmissions may include a normal sounding reference signal (SRS) transmission and a positing SRS transmission.

According to various embodiments, in the first predefined priority, a priority of the normal SRS transmission may be higher than a priority of the positing SRS transmission.

According to various embodiments, the method may further include allocating the transmit power to the UL transmissions according to the second priority based on that information on a second priority for allocating the transmit power is received.

According to various embodiments, the allocating the transmit power to the UL transmissions according to the first priority may be performed based on that the information on the second priority is not received.

According to various embodiments, the information on the second priority may include information for sequentially allocating an index to the UL transmissions according to the second priority.

According to various embodiments, the allocating the transmit power to the UL transmissions according to the first priority may include, based on that information on a plurality of power ratio values for allocating the transmit power is received, allocating maximum transmit power of the UE as transmit power of each of the UL transmissions according to a transmit power allocation ratio of each of the UL transmissions determined based on the plurality of power ratio values and a power value related to each of the UL transmissions.

According to various embodiments, each of the plurality of power ratio values may be related to a different one of the UL transmissions identified based on the first priority among the UL transmissions.

According to various embodiments, based on that (i) spatial relation information is received and (ii) a physical cell identifier (PCID) identified from a downlink (DL) reference signal (RS) related to the spatial relation information is different from a PCID configured in the UE, a priority of the positioning SRS transmission may be higher than a priority of at least one UL transmission among remaining UL transmissions except for the positioning SRS transmission among the UL transmissions.

According to various embodiments, the allocating the transmit power to the UL transmissions according to the first priority may be performed based on that (i) the spatial relation information is not received or (ii) the PCID identified from the DL RS is the same as the PCID configured in the UE.

According to various embodiments, the normal SRS transmission may be mapped to a first carrier in a frequency domain.

According to various embodiments, the positioning SRS transmission may be mapped to a second carrier different from the first carrier in the frequency domain.

According to various embodiments, the normal SRS transmission and the positioning SRS transmission may be mapped within the same time interval in a time domain.

According to various embodiments, based on that the normal SRS transmission and the positioning SRS transmission are configured as the same resource type, a priority of the normal SRS transmission may be higher than a priority of the positioning SRS transmission in the first priority.

According to various embodiments, the resource type may be one of aperiodic transmission, semi-static transmission, or periodic transmission.

According to various embodiments, a user equipment (UE) configured to operate in a wireless communication system may be provided.

According to various embodiments, the UE may include a transceiver, and at least one processor coupled with the transceiver.

According to various embodiments, the at least one processor may be configured to obtain a comparison result between a total transmit power of uplink (UL) transmissions and a maximum transmit power of the UE, and based on the comparison result, allocate a transmit power to the UL transmissions according to a first predefined priority.

According to various embodiments, the UL transmissions may include a normal sounding reference signal (SRS) transmission and a positing SRS transmission.

According to various embodiments, in the first predefined priority, a priority of the normal SRS transmission may be higher than a priority of the positing SRS transmission.

According to various embodiments, the at least one processor may be configured to allocate the transmit power to the UL transmissions according to the second priority based on that information on a second priority for allocating the transmit power is received.

According to various embodiments, the allocating the transmit power to the UL transmissions according to the first priority may be performed based on that the information on the second priority is not received.

According to various embodiments, the normal SRS transmission may be mapped to a first carrier in a frequency domain.

According to various embodiments, the positioning SRS transmission may be mapped to a second carrier different from the first carrier in the frequency domain.

According to various embodiments, the normal SRS transmission and the positioning SRS transmission may be mapped within the same time interval in a time domain.

According to various embodiments, the at least one processor may be configured to communicate with at least one of a UE, a network, and an autonomous vehicle other than a vehicle in which the UE is included.

According to various embodiments, a method performed by a base station in a wireless communication system may be provided.

According to various embodiments, the method may include receiving at least one UL transmission among uplink (UL) transmissions from a user equipment (UE); and processing the at least one UL transmission.

According to various embodiments, based on a comparison result between a total transmit power of the UL transmissions and a maximum transmit power of the UE, a transmit power of the at least one UL transmission is determined as a transmit power may be allocated to the UL transmissions according to a first predefined priority.

According to various embodiments, the UL transmissions may include a normal sounding reference signal (SRS) transmission and a positioning SRS transmission.

According to various embodiments, in the first priority, a priority of the normal SRS transmission may be higher than a priority of the positioning SRS transmission.

According to various embodiments, a base station operating in a wireless communication system may be provided.

According to various embodiments, the base station may include a transceiver, and at least one processor coupled with the transceiver.

According to various embodiments, the at least one processor may be configured to receive at least one UL transmission among uplink (UL) transmissions from a user equipment (UE) and process the at least one UL transmission.

According to various embodiments, based on a comparison result between a total transmit power of the UL transmissions and a maximum transmit power of the UE, a transmit power of the at least one UL transmission may be determined as a transmit power is allocated to the UL transmissions according to a first predefined priority.

According to various embodiments, the UL transmissions may include a normal sounding reference signal (SRS) transmission and a positioning SRS transmission.

According to various embodiments, in the first priority, a priority of the normal SRS transmission may be higher than a priority of the positioning SRS transmission.

According to various embodiments, an apparatus operating in a wireless communication system may be provided.

According to various embodiments, the device may include at least one processor, and one or more memories configured to store at least one instruction for causing the at least one processor to perform a method, wherein the method may include obtaining a comparison result between a total transmit power of uplink (UL) transmissions and a maximum transmit power of the device; and based on the comparison result, allocating a transmit power to the UL transmissions according to a first predefined priority.

According to various embodiments, the UL transmissions may include a normal sounding reference signal (SRS) transmission and a positing SRS transmission.

According to various embodiments, in the first predefined priority, a priority of the normal SRS transmission may be higher than a priority of the positing SRS transmission.

According to various embodiments, a processor-readable medium storing at least one instruction to cause at least one processor to perform a method may be provided.

According to various embodiments, the method may include obtaining a comparison result between a total transmit power of uplink (UL) transmissions and a preconfigured maximum transmit power, and based on the comparison result, allocating a transmit power to the UL transmissions according to a first predefined priority.

According to various embodiments, the UL transmissions may include a normal sounding reference signal (SRS) transmission and a positing SRS transmission.

According to various embodiments, in the first predefined priority, a priority of the normal SRS transmission may be higher than a priority of the positing SRS transmission.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

According to various embodiments, a signal may be effectively transmitted and received in a wireless communication system.

According to various embodiments, positioning may be effectively performed in a wireless communication system.

According to various embodiments, a priority in terms of power allocation between a positioning SRS and other UL signals may be proposed.

According to various embodiments, a limited UE may efficiently use transmit power.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF THE DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
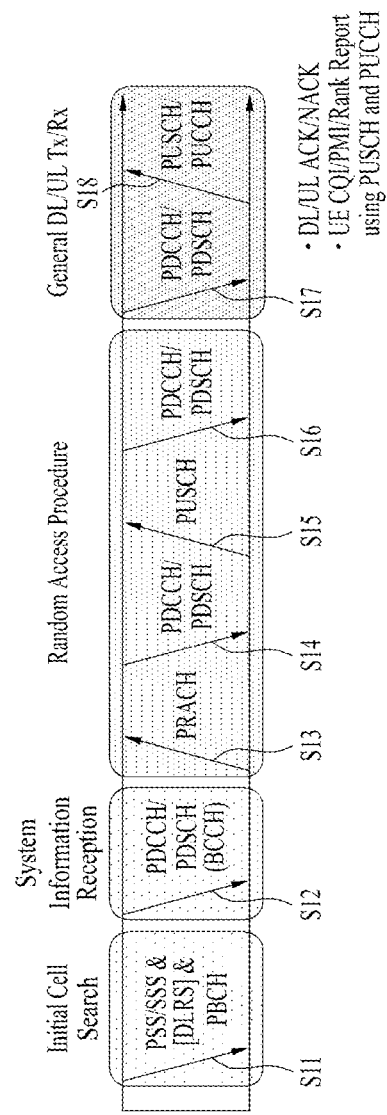
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
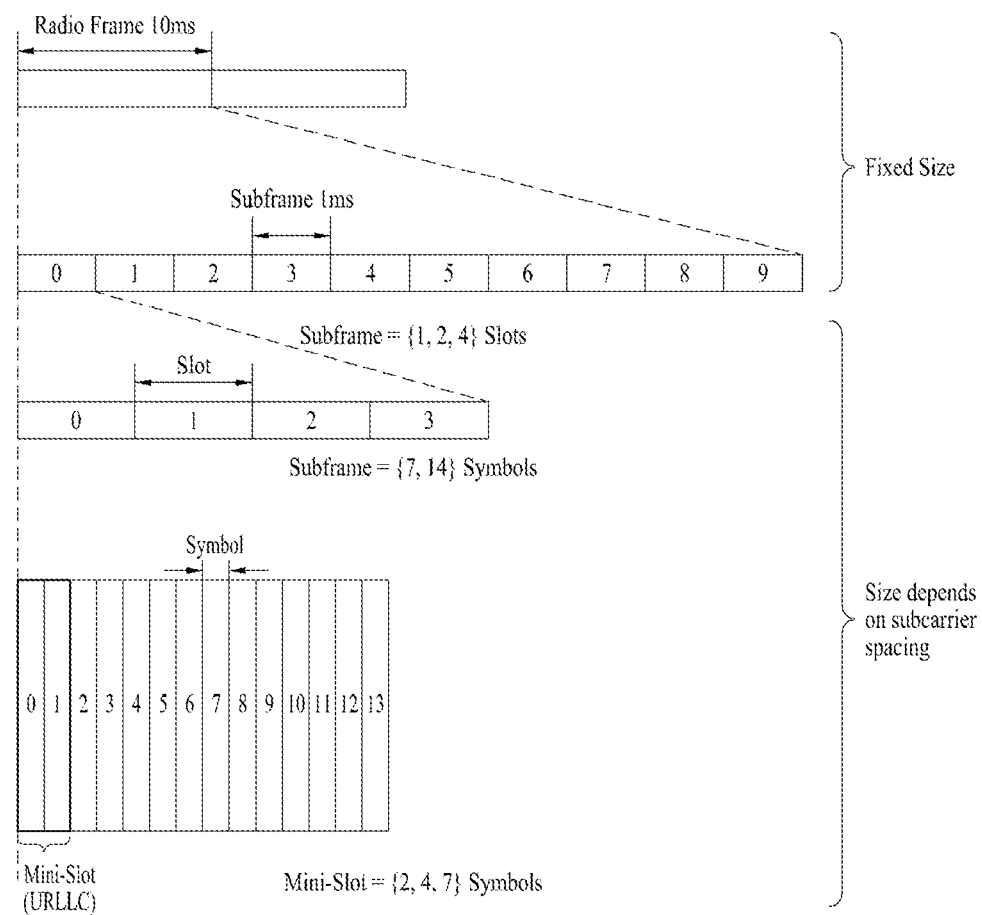
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), μ and a CP are obtained from RRC parameters provided by the BS.

TABLE 1

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^{\mu}_s \in \{0, \ldots, N^{slot,\mu}_{subframe}-1\}$ in an increasing order in a subframe, and with $n^{\mu}_{s,f} \in \{0, \ldots, N^{slot,\mu}_{frame}-1\}$ in an increasing order in a radio frame. One slot includes $N^{\mu}_{symb}$ consecutive OFDM symbols, and $N^{\mu}_{symb}$ depends on a CP. The start of a slot $n^{\mu}_s$ in a subframe is aligned in time with the start of an OFDM symbol $n^{\mu}_s*N^{\mu}_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

-continued

| $\mu$ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N_{symb}^{slot}$ represents the number of symbols in a slot, $N_{slot}^{frame}$ represents the number of slots in a frame, and $N_{slot}^{subframe}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
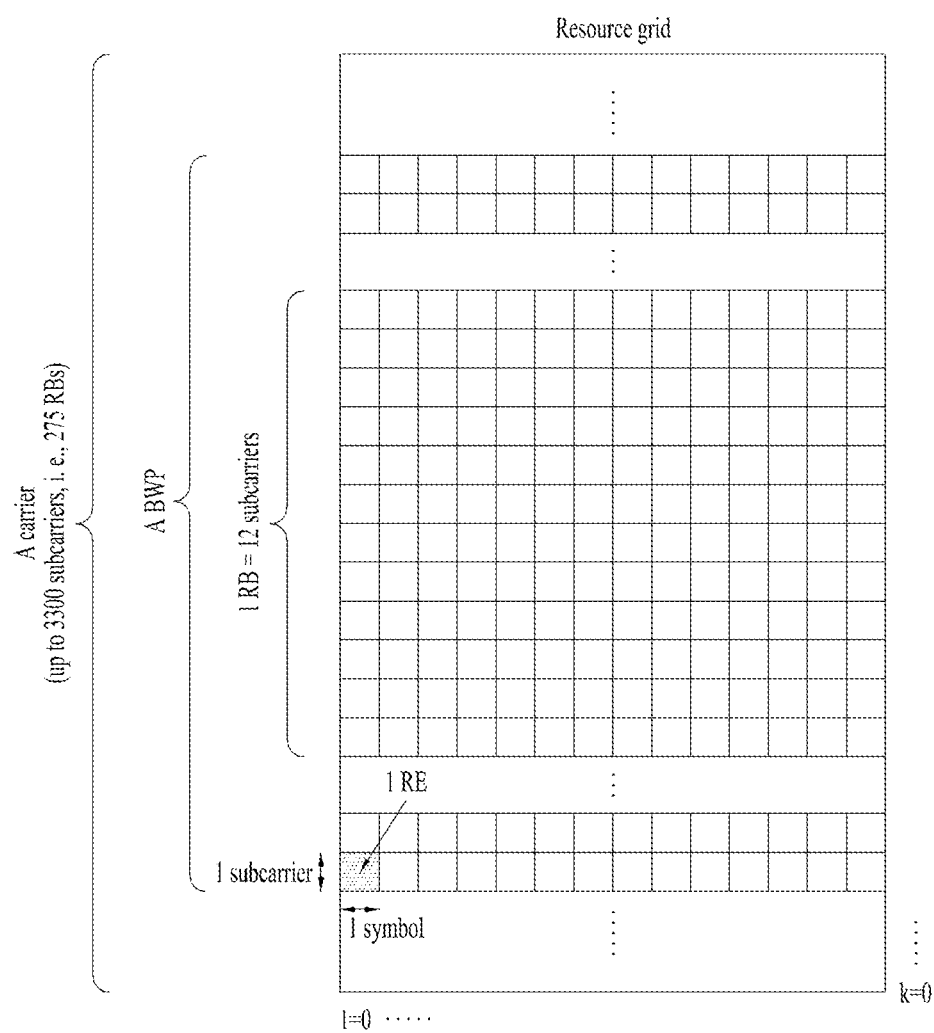
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^{\mu}$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
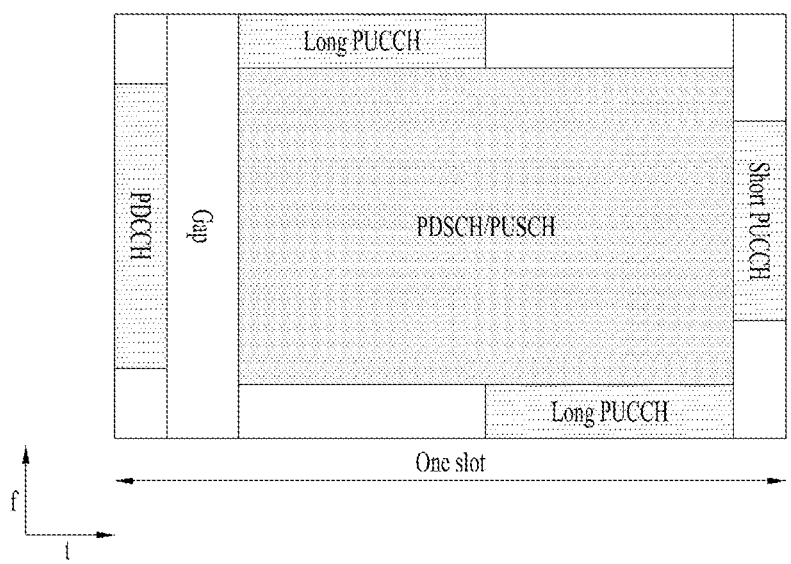
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. Carrier Aggregation (CA)

NR may support a wider uplink/downlink bandwidth by aggregating a plurality of uplink/downlink carriers (i.e., carrier aggregation). Through carrier aggregation, it may be possible to transmit/receive signals on multiple carriers. When carrier aggregation is applied, each carrier may be referred to as a component carrier (CC). CCs may or may not be adjacent to each other in the frequency domain. A bandwidth of each of the CC may be independently determined. Asymmetrical carrier aggregation with UL CCs and DL CCs, the numbers of which are different, is possible. In NR, radio resources may be classified/managed by cells, and a cell may include one DL CC and 0 to 2 UL CCs. For example, a cell may include (i) only one DL CC, (ii) one DC CC and one UL CC, or (ii) one DL CC and two UL CCs (including one supplementary UL CC). Cells may be classified as follows. In the description of various embodiments, a cell may be interpreted according to a context, and may mean, for example, a serving cell. In addition, unless otherwise described, operations according to various embodiments may be applied to each serving cell.

Primary Cell (PCell): A cell operating at a primary frequency (e.g., Primary Component Carrier (PCC)) at which a UE performs an initial connection establishment procedure or initiates a connection re-establishment procedure when the UE is configured with carrier aggregation. A Master Cell Group (MCG) cell operating at a primary frequency at which a UE performs an initial connection establishment procedure or initiates a connection re-establishment procedure in the case of Dual connectivity (DC).

Secondary Cell (SCell): A cell that additionally provides a radio resource other than SpCell in the case of a UE configured with carrier aggregation.

Primary SCG Cell/Primary Second Cell (PSCell): A Secondary Cell Group (SCG) cell in which a UE performs random access when RRC reconfiguration and synchronization are performed in the case of DC.

Special Cell (SpCell): In the case of DC, the SpCell is a PCell of MCG or a PSCell of SCG. Otherwise (i.e., non-DC), the SpCell is a PCell.

Serving cell (ServCell): This is a cell configured in a UE in an RRC_CONNECTED state. When CA/DC is not configured, only one serving cell (i.e., PCell) is present. When CA/DC is configured, the serving cell is a cell set including SpCell (s) and all SCells.

Control information may be configured to be transmitted and received only through a specific cell. For example, UCI may be transmitted only through a SpCell (e.g., PCell). When an SCell (hereinafter, a PUCCH-SCell) in which PUCCH transmission is allowed is configured, UCI may also be transmitted through the PUCCH-SCell. In another example, a BS may allocate a scheduling cell (set) to reduce the complexity of PDCCH blinding decoding (BD) at a UE side. For PDSCH reception/PUSCH transmission, the UE may perform PDCCH detection/decoding only in a scheduling cell. In addition, the BS may transmit the PDCCH only through the scheduling cell (set). For example, the PDCCH for downlink assignment may be transmitted in cell #0 (i.e., a scheduling cell), and the corresponding PDSCH may be transmitted in cell #2 (i.e., a scheduled (scheduled) cell) (Cross-Carrier Scheduling (CCS)). The scheduling cell (set) may be configured in a UE-specific, UE-group-specific or cell-specific manner. The scheduling cell may include an SpCell (e.g., a PCell).

For CCS, a carrier indicator field (CIF) may be used. The CIF may be semi-static and may be disabled/enabled via UE-specific (or UE-group-specific) higher layer (e.g., Radio Resource Control (RRC)) signaling. The CIF field may be an x-bit field (e.g., x=3) in the PDCCH (i.e., DCI) and may be used to indicate a (serving) cell index of the scheduled cell.

CIF disabled/inactivated: There is no CIF in the PDCCH. The PDCCH on a scheduling cell may allocate PDSCH/PUSCH resources on the same cell. That is, the scheduling cell may be the same as the scheduled cell.

CIF enabled/activated: There is a CIF in a PDCCH. The PDCCH on scheduling may allocate PDSCH/PUSCH resource on one cell among a plurality of cells using the CIF. The scheduling cell may be the same as or different from the scheduled cell. PDSCH/PUSCH may mean a PDSCH or a PUSCH.

Figure 5:
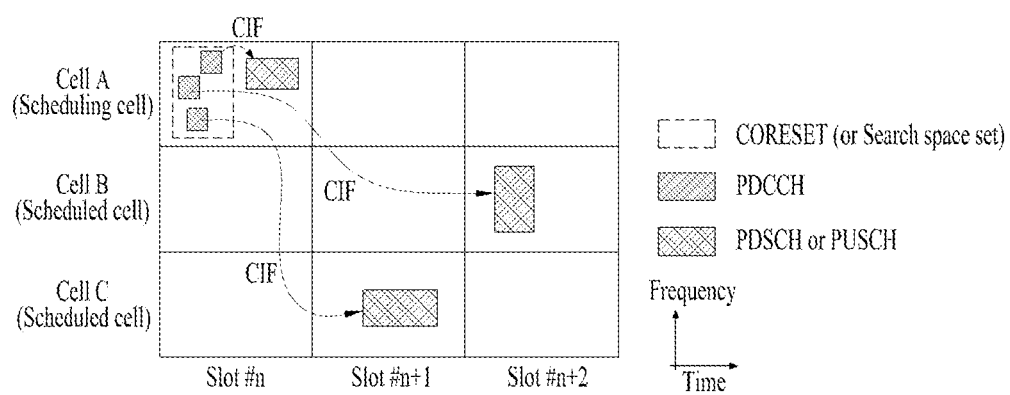
FIG. 5 is a diagram illustrating an example of a scheduling method in the case of carrier aggregation to which various embodiments are applicable.

FIG. 5 is a diagram showing an example of a scheduling method in the case of a carrier aggregation to which various embodiments are applicable. FIG. 5 shows an example of scheduling when multi-cells are aggregated.

Referring to FIG. 5, three cells may be assumed to be aggregated. When a CIF is disabled, each cell may transmit only a PDCCH in which a PDSCH/PUSCH of the cell is scheduled (self-carrier scheduling, SCS). In contrast, when a CIF is enabled via UE-specific (or UE-group-specific or cell-specific) higher layer signaling and cell A is configured as a scheduling cell, the cell A may transmit a PDCCH for scheduling a PDSCH/PUSCH of another cell (i.e., a scheduled cell) as well as a PDCCH for scheduling a PDSCH/PUSCH of the cell A (cross-carrier scheduling, CCS). In this case, a cell B/C may not transmit a PDCCH for scheduling of a cell of the cell B/C.

In order to configure MSG and/or SCG, information element (IE) CellGroupConfig may be used. A cell group may include one medium access control (MAC) entity, a set of logical channels related to a radio link control (RLC) entity, a PCell (SpCell), and/or one or more SCells. CellGroupConfig may include at least fields of Table 5.

TABLE 5

CellGroupConfig ::= SEQUENCE {
  cellGroupId CellGroupId,
  rlc-BearerToAddModList SEQUENCE (SIZE (1..max-LC-ID)) OF RLC-
BearerConfig OPTIONAL, -- Need N
  rlc-BearerToReleaseList SEQUENCE (SIZE (1..maxLC-ID)) OF
LogicalChannelIdentity OPTIONAL, -- Need N
  mac-CellGroupConfig MAC-CellGroupConfig
OPTIONAL, -- Need M
  physicalCellGroupConfig PhysicalCellGroupConfig
OPTIONAL, -- Need M
  spCellConfig SpCellConfig
OPTIONAL, -- Need M
  sCellToAddModList SEQUENCE (S1ZE (1..maxNrofSCells)) OF
SCellConfiq OPTIONAL, -- Need N
  sCellToReleaseList SEQUENCE (SIZE (1..maxNrofSCells)) OF TABLE 5-continued SCellIndex OPTIONAL, -- Need N
...,
[[
  reportUplinkTxDirectCurrent ENUMERATED {true}
OPTIONAL -- Cond BWP-Reconfig
]],
SCellConfig ::= SEQUENCE {
  sCellIndex SCellIndex,
  sCellConfigCommon ServingCellConfigCommon
OPTIONAL, -- Cond SCellAdd
  sCellConfigDedicated ServingCellConfig
OPTIONAL, -- Cond sCellAddMod
...,
[[
  smtc SSB-MTC
OPTIONAL -- Need S
]],
[[
sCellstate-r16 ENUMERATED {activated}
OPTIONAL, -- Cond SCellAddSync
  secondaryDRX- GroupConfig-r16 ENUMERATED {true}
OPTIONAL, -- Cond DRX-Config2
]]}

For a description of each field in Table 5, refer to Tables 6 to 9.

TABLE 6

| CellGroupConfig field descriptions |
| --- |
| mac-CellGroupConfig |
| MAC parameters applicable for the entire cell group. |
| rlc-BearerToAddModList |
| Configuration of the MAC Logical Channel, the corresponding RLC entities and association with radio bearers. |
| reportUplinkTxDirectCurrent |
| Enables reporting of uplink and supplementary uplink Direct Current location information upon BWP configuration and reconfiguration. This field is only present when the BWP configuration is modified or any serving cell is added or removed. This field is absent in the IE CellGroupConfig when provided as part of RRCSetup message. If UE is configured with SUL carrier, UE reports both UL and SUL Direct Current locations. |
| sCellToAddModList |
| List of secondary serving cells (SCells) to be added or modified. |
| sCellToReleaseList |
| List of secondary serving cells (SCells) to be released. |
| spCellConfig |
| Parameters for the SpCell of this cell group (PCell of MCG or PSCell of SCG) |

TABLE 7

| SCellConfig field descriptions |
| --- |
| smtc |
| The SSB periodicity/offset/duration configuration of target cell for NR SCell addition. The network sets the periodicityAndOffset to indicate the same periodicity as ssb-periodicityServingCell in sCellConfigCommon. The smtc is based on the timing of the SpCell of associated cell group. In case of inter-RAT handover to NR, the timing reference is the NR PCell. In case of intra-NR PCell change (standalone NR) or NR PSCell change (EN-DC), the timing reference is the target SpCell. If the field is absent, the UE uses the SMTC in the measObjectNR having the same SSB frequency and subcarrier spacing, as configured before the reception of the RRC message. |

TABLE 8

| SpCellConfig field descriptions |
| --- |
| servCellIndex |
| Serving cell ID of a PSCell. The PCell of the Master Cell Group uses ID = 0. |

TABLE 9

| Conditional Presence | Explanation |
| --- | --- |
| BWP-Reconfig | The field is optionally present, Need N, if the BWPs are reconfigured or if serving cells are added or removed. Otherwise it is absent. |
| DRX-Config2 | The field is optionally present, Need N, if drx-ConfigSecondaryGroup is configured. It is absent otherwise. |
| ReconfWithSync | The field is mandatory present in the RRCReconfiguration message:<br>- in each configured CellGroupConfig for which the SpCell changes,<br>- in the masterCellGroup at change of AS security Key derived from $K_{gNB}$,<br>- in the secondaryCellGroup at:<br>- PSCell addition,<br>- SCG resume with NR-DC or (NG)EN-DC,<br>- update of required SI for PSCell,<br>- change of AS security key derived from $S-K_{gNB}$ while the UE is configured with at least one radio bearer with KeyToUse set to secondary and that is not released by this RRCReconfiguration message,<br>Otherwise, it is optionally present, need M. The field is absent in the masterCellGroup in RRCResume and RRCSetup messages and is absent in the masterCellGroup in RRCReconfiguration messages if source configuration is not released during DAPS handover. |
| SCellAdd | The field is mandatory present upon SCell addition; otherwise it is absent, Need M. |
| SCellAddMod | The field is mandatory present upon SCell addition; otherwise it is optionally present, need M. |
| SCellAddSync | The field is optionally present, Need N, in case of SCell addition, reconfiguration with sync, and resuming an RRC connection. It is absent otherwise. |
| SCG | The field is mandatory present in an SpCellConfig for the PSCell. It is absent otherwise. |

IE ServingCellConfigCommon may be used to configure a cell-specific parameter of a serving cell of a UE. The IE may include parameters that are generally obtained from a SSB, an MIB, or SIBs when the UE accesses a cell in IDLE. From the IE, a network may provide this information via dedicated signaling when configuring the SCell and/or an additional cell group (SCG) to the UE. In addition, upon reconfiguration with sync, the information may be provided for the SpCell (MCG and/or SCG). ServingCellConfigCommon may include at least fields of Table 10.

TABLE 10

```
ServingCellConfigCommon ::= SEQUENCE {
  physCellId PhysCellId
OPTIONAL, -- Cond HOAndServCellAdd,
  downlinkConfigCommon DownlinkConfigCommon
OPTIONAL, -- Cond HOAndServCellAdd
  uplinkConfigCommon UplinkConfigCommon
OPTIONAL, -- Need M
  supplementaryUplinkConfig UplinkConfigCommon
OPTIONAL, -- Need B
  n-TimingAdvanceOffset ENUMERATED { n0, n25600, n39936 }
OPTIONAL, -- Need B
  ssb-PositionsInBurst CHOICE (
     shortBitmap BIT STRING (SIZE (4)),
     mediumBitmap BIT STRING (SIZE (8)),
     longBitmap BIT STRING (SIZE (64))
  }
OPTIONAL, -- Cond AbsFreqSSB
  ssb-periodicityServingCell ENUMERATED ( ma5, ms10, ms20, ms40, ms80, ms160,
spare2, spare1 ) OPTIONAL, -- Need S
     dmrs-TypeA-Position ENUMERATED (pos2 , pos3),
     lte--CR3-ToMatchAround SetupRelease (RateMatchPatternLTE-CRS)
OPTIONAL, -- Need M
     rateMatchPatternToAddModList SEQUENCE (SIZE (1..maxNrofRateMatchPatterns))
OF RateMatchPattern OPTIONAL, -- Need N
     rateMatchPatternToReleaseList SEQUENCE (SIZE (1..maxNrofRateMatchPatterns))
OF RateMatchPstternId OPTIONAL, -- Need N
     ssbSubcarrierSpacing SubcarrierSpacing
OPTIONAL, -- Cond HOAndServeCellWithSSB
     tdd-UL-DL-ConfigurationCommon TDD-UL-DL-ConfigCommon
OPTIONAL, -- Cond TDD
     ss-PBCH-BlockPower INTEGER (-60..50),
     ...,
     [[
     channelAccessNode-r16 CHOICE {
        dynamic NULL,
           semiStatic SemiStaticChannelAccessConfig
     }
OPTIONAL, -- Cond SharedSpectrum
     discoveryBurstWindowLength-r16 ENUMERATED (ms0dot5, ms1, ms2, ms3, ms4,
ms5) OPTIONAL, -- Need M
     ssb-PositionQCL-r16 SSB-PositionQCL-Relation-r16
```

TABLE 10-continued

```
OPTIONAL, -- Cond SharedSpectrum
  highSpeedConfig-r16 HighSpeedConfig-r16
OPTIONAL -- Need R
  ]]
}
```

For a description of each field in Table 10, refer to Tables 11 to 12.

TABLE 11

ServingCellConfigCommon field descriptions channelAccessMode
If present, this field indicates which channel access procedures to apply for operation with shared spectrum channel access as defined in TS 37.213 [48]. If the field is configured as "semiStatic", the UE shall apply the channel access procedures for semi-static channel occupancy as described in subclause 4.3 in TS 37.213. If the field is configured as "dynamic", the UE shall apply the channel access procedures in TS 37.213, with the exception of subclause 4.3 of TS 37.213.
dmrs-TypeA-Position
Position of (first) DM-RS for downlink (see TS 38.211 [16], clause 7.4.1.1.1) and uplink (TS 38.211 [16], clause 6.4.1.1.3).
downlinkConfigCommon
The common downlink configuration of the serving cell, including the frequency information configuration and the initial downlink BWP common configuration. The parameters provided herein should match the parameters configured by MIB and SIB1 (if provided) of the serving cell, with the exception of controlResourcSetZero and searchSpaceZero which can be configured in ServingCellConfigCommon even if MIB indicates that they are absent.
discoveryBurstWindowLength
Indicates the window length of the discovery burst in ms (see TB 37.213 [48]).
longBitmap
Bimap when maximun number of SS/PBCH blocks per half frame equals to 64 as defined in TS 38.213 [13], clause 4.1.
lte-CRS-ToMatchAround
Parameters to determine an LTE CRS pattern that the UE shall rate match around.
mediumBitmap
Bitmap when maximum number of SS/PBCH blocks per half frame equals to 8 as defined in TS 38.213 [13], clause 4.1.
n-TimingAdvanceOffset
The N_TA-Offset to be applied for all uplink transmissions on this serving cell. If the field is absent, the UE applies the value defined for the duplex mode and frequency range of this serving cell. See TS 38.133 [14], table 7.1.2-2.
rateMatchPatternToAddModList
Resources patterns which the UE should rate match PDSCH around. The UE rate matches around the union of all resources indicated in the rate match patterns. Rate match patterns defined here on cell level apply only to PDSCH of the same numerology (see TS 38.214 [19], clause 5.4.4.1).
semiStaticChannelAccessConfig
The parameters for semi-static channel access.
shortBitmap
Bitmap when maximum number of SS/PBCH blocks per half frame equals to 4 as defined in TS 38.213 [13], clause 4.1.
ss-PBCH-BlockPower
Average EPRE of the resources elements that carry secondary synchronization signals in dBm that the NW used for SSB transmission, see TS 38.213 [13], clause 7.
ssb-periodicityServingCell
The SSB periodicity in ms for the rate matching purpose. If the field is absent, the UE applies the value ms5, (see TS 38.213 [13], clause 4.1)
ssb-PositionQCL
Indicates the QCL relationship between SSB positions for this serving cell as specified in TS 38.213 [13] clause 4.1.
ssb-PositionsInBurst
For operation in licensed spectrum, indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in ServingCellConfigCommonSIB.
For operation with shared spectrum channel access, only mediumBitmap is used and the UE assumes that one or more SS/PBCH blocks indicated by ssb-PostionsInBurst may be transmitted within the discovery burst transmission window and have candidate SS/PBCH blocks indexes corresponding to SS/PBCH block indexes provided by ssb-PositonsInBurst (see TS 38.213 [13], clause 4.1). If the k-th bit of ssb-PositionsInBurst is set to 1, the UE assumes that one or more SS/PBCH blocks within the discovery burst transmission window with candidate SS/PBCH block indexes corresponding to SS/PBCH block index equal to k −1 may be transmitted; if the kt-th bit is set to 0, the UE assumes that the corresponding SS/PBCH block(s) are not transmitted. If ssb-PositionQCL is configured, the UE expects that the k-th bit is set to 0, where k > ssb-PositionQCL and the number of actually transmitted SS/PBCH blocks is not larger than the number of 1's is the bitmap. The network configures the same pattern in this field as in the corresponding field in ServingCellConfigCommonSIB.
ssbSubcarrierSpacing
Subcarrier spading of SSB. Only the values 15 kHz or 30 kHz (FR1), and 120 kHz or 240 kHz (FR2) are applicable.
supplementaryUplinkConfig
The network configures this field only if uplinkConfigCommon is configured. If this field is absent, the UE shall release the supplementaryUplinkConfig and the supplementaryUplink configured in ServingCellConfig of this serving cell, if configured.
tdd-UL-DL-ConfigurationCommon
A cell-specific TDD UL/DL configuration, see TS 38.213 [13], cause 11.1.

TABLE 12

| Conditional Presence | Explanation |
| --- | --- |
| AbsFreqSSB | The field is absent when absoluteFrequencySSB in frequencyInfoDL is absent, otherwise the field is mandatory present. |
| HOAndServCellAdd | This field is mandatory present upon SpCell change and upon serving cell (PSCell/SCell) addition. Otherwise, the field is absent. |
| HOAndServCellWithSSB | This field is mandatory present upon SpCell change and upon serving cell (SCell with SSB or PSCell) addition. Otherwise, the field is absent. |
| SharedSpectrum | This field is mandatory present if this cell operates with shared spectrum channel access. Otherwise, it is absent, Need R. |
| TDD | The field is optionally present, Need R, for TDD cells; otherwise it is absent. |

1.4. Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

UL BM Process

In UL BM, reciprocity (or beam correspondence) between a Tx beam and an Rx beam may or may not be established depending on UE implementation. When the Tx beam-Rx beam reciprocity is established for both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

The UL BM process may be divided into a UE's Tx beam sweeping and a BS's Rx beam sweeping.

Figure 6:
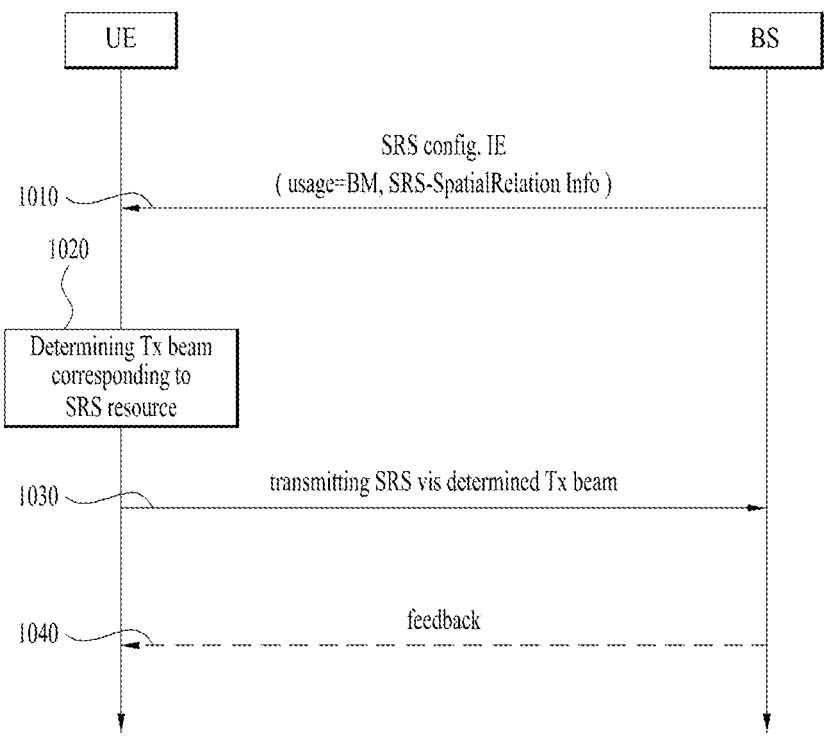
FIG. 6 is a diagram illustrating a signal flow for an exemplary UL BM process using an SRS, which is applicable to various embodiments.

FIG. 6 is a diagram illustrating a signal flow for an exemplary UL BM process using an SRS, which is applicable to various embodiments.

A UE receives, from a BS, RRC signaling (e.g., SRS-Config 1E) including (an RRC parameter) usage set to 'beam management' (1010). The SRS-Config 1E is used for an SRS transmission configuration. The SRS-Config 1E includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config 1E (1020). SRS-SpatialRelation Info is configured for each SRS resource and indicates whether to apply the same beamforming as used for an SSB, a CSI-RS, or an SRS on an SRS resource basis.

If SRS-SpatialRelationInfo is configured for an SRS resource, the same beamforming as used for the SSB, the CSI-RS, or the SRS is applied for transmission. However, if SRS-SpatialRelationInfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationInfo is set to 'SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial Relation Info is configured for all SRS resources within an SRS resource set, the UE transmits the SRS with a beam indicated by the BS. For example, if the Spatial Relation Info indicates all the same SSB, CRI, or SRI, the UE repeatedly transmits the SRS with the same beam.

ii) Spatial Relation Info may be configured for none of the SRS resources within the SRS resource set. In this case, the UE may perform transmission while freely changing SRS beamforming.

iii) Spatial Relation Info may be configured for only some SRS resources within the SRS resource set. In this case, the UE may transmit the SRS in the configured SRS resources with the indicated beam, and transmit the SRS in SRS resources for which Spatial Relation Info is not configured, by randomly applying Tx beamforming.

1.5. Uplink Power Control

Figure 7:
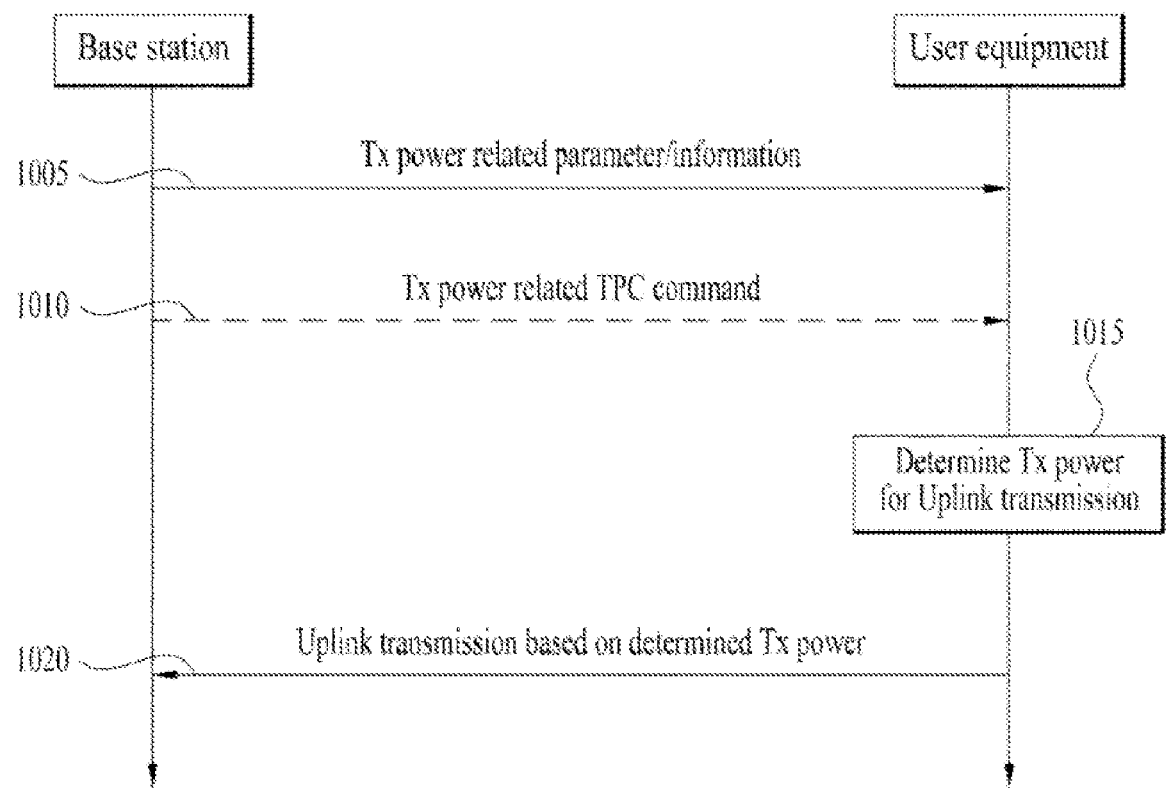
FIG. 7 is a diagram illustrating an exemplary procedure for controlling UL transmission power to which various embodiments are applicable.

FIG. 7 is a diagram illustrating an exemplary procedure for controlling UL transmission power to which various embodiments are applicable.

First, a UE may receive parameters and/or information related to transmission power (Tx power) from a BS (1005). In this case, the UE may receive the corresponding parameters and/or information through higher layer signaling (e.g., RRC signaling, MAC-CE, etc.). For example, for PUSCH transmission, PUCCH transmission, SRS transmission, and/or PRACH transmission, the UE may receive the above-described parameters and/or information related to transmission power control.

The UE may receive a TPC command related to transmission power from the BS (1010). In this case, the UE may receive the corresponding TPC command through lower layer signaling (e.g., DCI). For example, for PUSCH transmission, PUCCH transmission, and/or SRS transmission, the UE may receive information on a TPC command to be used for determining a power control adjustment state, etc. in a TPC command field of a predefined DCI format as described above. However, the corresponding step may be omitted in PRACH transmission.

The UE may determine (or calculate) transmission power for UL transmission based on the parameters, information, and/or TPC command received from the BS (1015). For example, the UE may determine PUSCH transmission power, PUCCH transmission power, SRS transmission power, and/or PRACH transmission power according to the above-described methods (e.g., Equations 1 to 4, etc.). Additionally/alternatively, when two or more UL channels and/or signals need to be transmitted together as in carrier aggregation, the UE may determine the transmission power for UL transmission in consideration of the above-described priorities.

The UE may perform transmission of one or more UL channels and/or signals (e.g., PUSCH, PUCCH, SRS, PRACH, etc.) to the BS based on the determined (or calculated) transmission power (1020).

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 8:
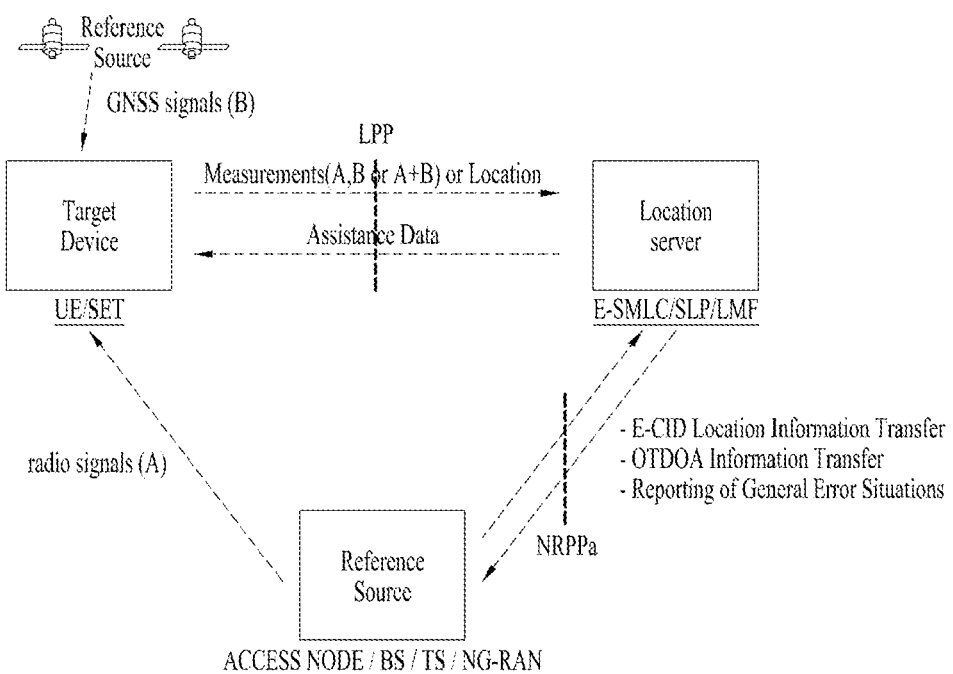
FIG. 8 is a diagram illustrating a positioning protocol configuration for positioning a user equipment (UE), to which various embodiments are applicable.

FIG. 8 is a diagram illustrating an exemplary positioning protocol configuration for positioning a UE, to which various embodiments are applicable.

Referring to FIG. 8, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\right.$$
$$\left.\left(2\left(n_{ID,seq}^{PRS} \bmod 1024\right) + 1\right) + \left(n_{ID,seq}^{PRS} \bmod 1024\right)\right) \bmod 2^{31} \quad \text{[Equation 2]}$$

$n_{s,f}^{\mu}$ may be a slot number in a frame in an SCS configuration μ. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS r(m) sequence may be scaled $\beta_{PRS}$ by and mapped to REs (k, l)$_{p,\mu}$ specifically by Equation 3. (k, l)$_{p,\mu}$ may represent an RE (k, l) for an antenna port p and the SCS configuration μ.

$$a_{k,l}^{(p,\mu)} = \beta_{PRS}r(m)$$

$$m=0,1,\ldots$$

$$k=mK_{comb}^{PRS}+((k_{offset}^{PRS}+k')\bmod K_{comb}^{PRS})$$

$$l=l_{start}^{PRS}, l_{start}^{PRS}+1, \ldots, l_{start}^{PRS}+L_{PRS}-1 \quad \text{[Equation 3]}$$

Herein, the following conditions may have to be satisfied:

The REs (k, l)$_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS- ResourceSymbolOffset. The time-domain size of the DL PRS resource, $L_{pRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0, 1, \ldots, K_{comb}^{PRS}-1\}$ may be given by combOffset. A frequency offset k' may be a function of $1-l_{state}^{PRS}$ as shown in Table 13.

TABLE 13

| $K_{comb}^{PRS}$ | Symbol number within the downlink PRS resource $1 - l_{start}^{PRS}$ | | | | | | | | | | |
|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \mod 2^{\mu} T_{per}^{PRS} \in \quad \text{[Equation 4]}$$

$$\{iT_{gap}^{PRS}\}_{i=0}^{T_{rep}^{PRS}-1}$$

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{0, 1, \ldots, T_{per}^{PRS} - 1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5, 8,10,16,20,32,40,64,80,160,320,640,1280,2560,5120, 10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBaRepeationFactor. A time gap $T_{gap}^{PRS} \in \{1,2, 4,8,16,32\}$ may be given by a higher-layer parameter DL-PRS-ResourceTimeGap.

2.3. UE Positioning Architecture

Figure 9:
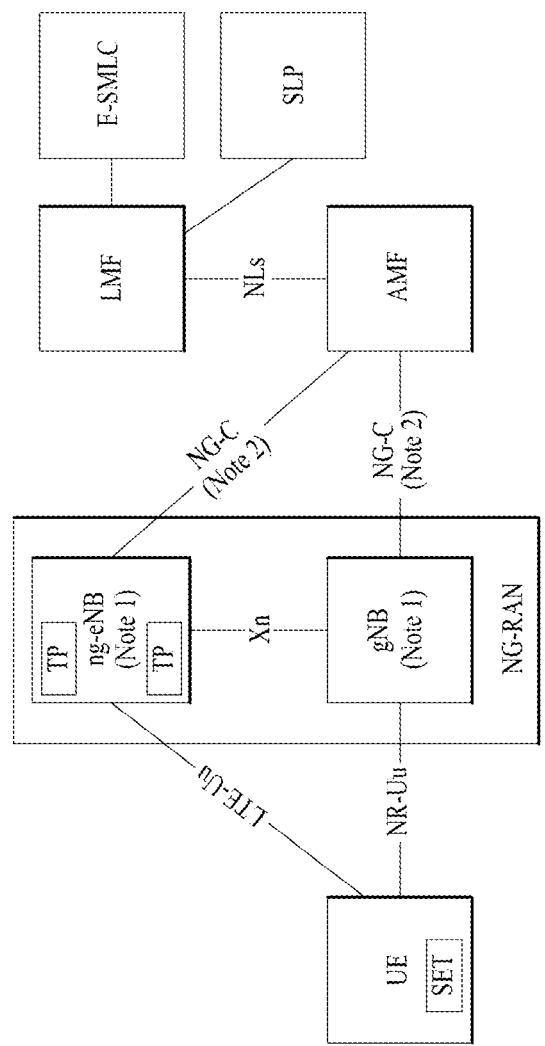
FIG. 9 illustrates an exemplary system architecture for measuring positioning of a UE to which various embodiments are applicable.

FIG. 9 illustrates an exemplary system architecture for measuring positioning of a UE to which various embodiments are applicable.

Referring to FIG. 9, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 10:
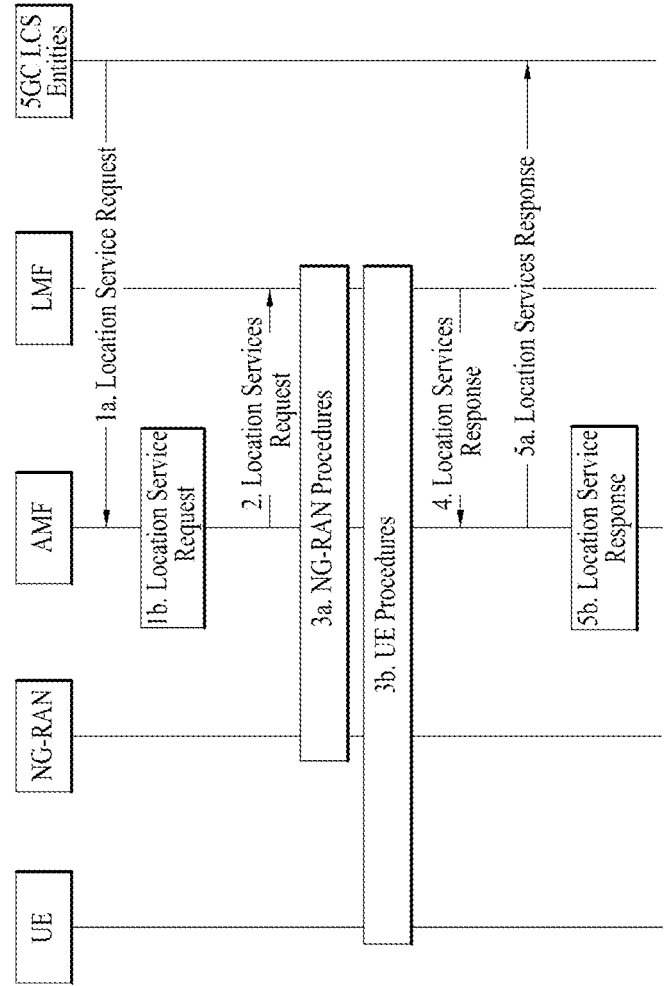
FIG. 10 illustrates an implementation example of a network for UE positioning.

FIG. 10 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 11 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 10. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 11 has been initiated by step 1b, the AMF may use the location service response in order to provide a location service related to an emergency call.

2.5. Positioning Protocol

LTE Positioning Protocol (LPP)

Figure 11:
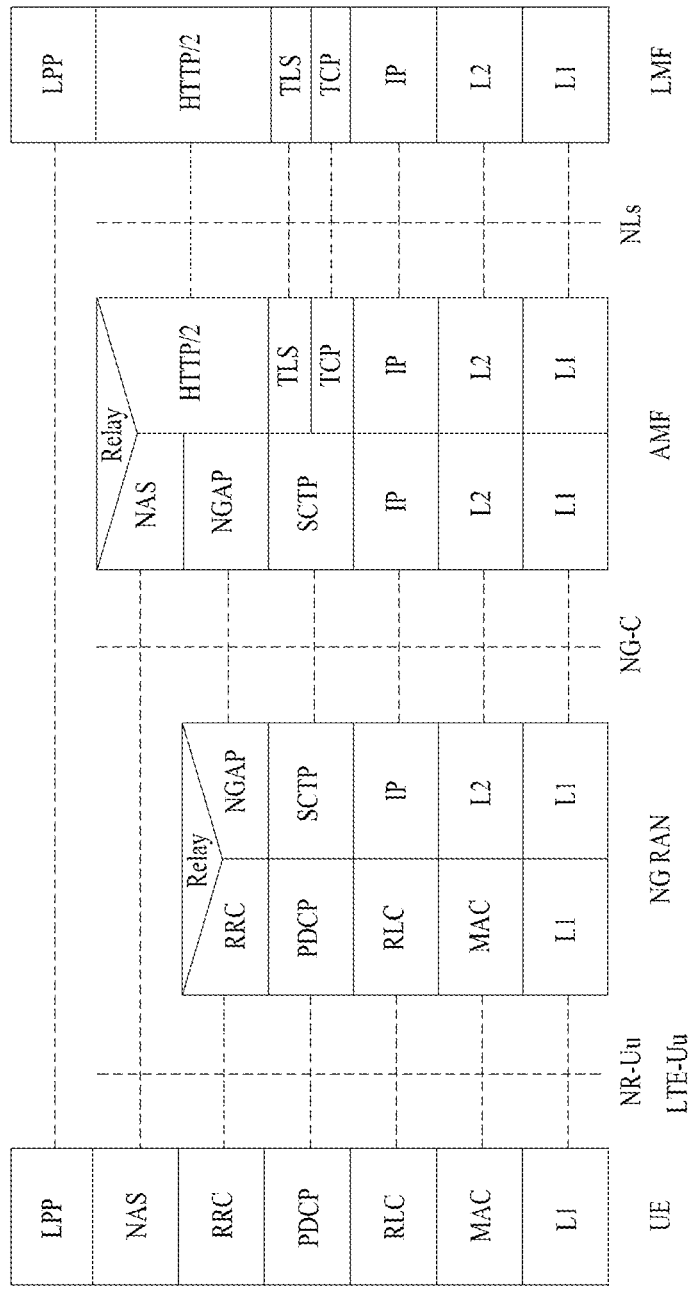
FIG. 11 is a diagram illustrating protocol layers for supporting LTE positioning protocol (LPP) message transmission, to which various embodiments are applicable.

FIG. 11 illustrates an exemplary protocol layer used to support LPP message transfer between an LMF and a UE. An LPP protocol data unit (PDU) may be carried in a NAS PDU between an AMF and the UE.

Referring to FIG. 11, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 12:
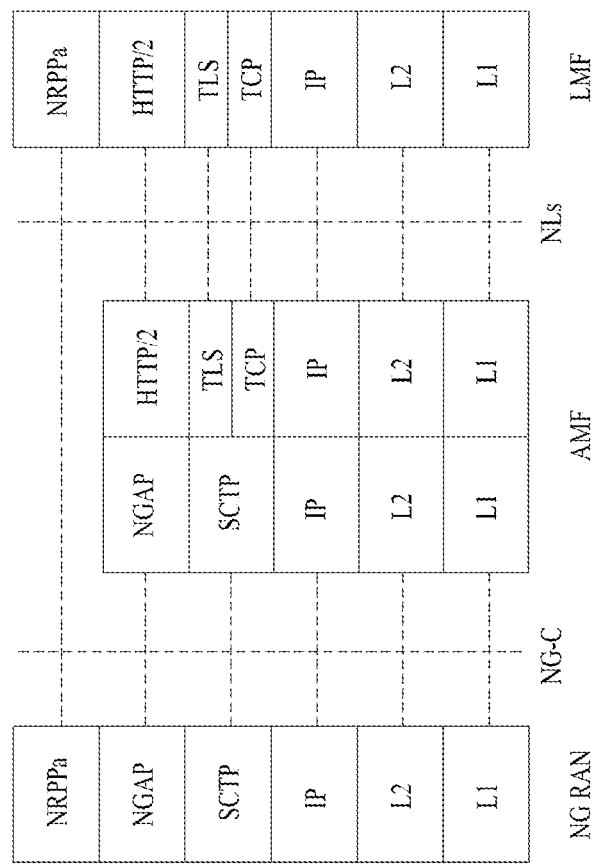
FIG. 12 is a diagram illustrating protocol layers for supporting NR positioning protocol a (NRPPa) protocol data unit (PDU) transmission, to which various embodiments are applicable.

FIG. 12 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

Figure 13:
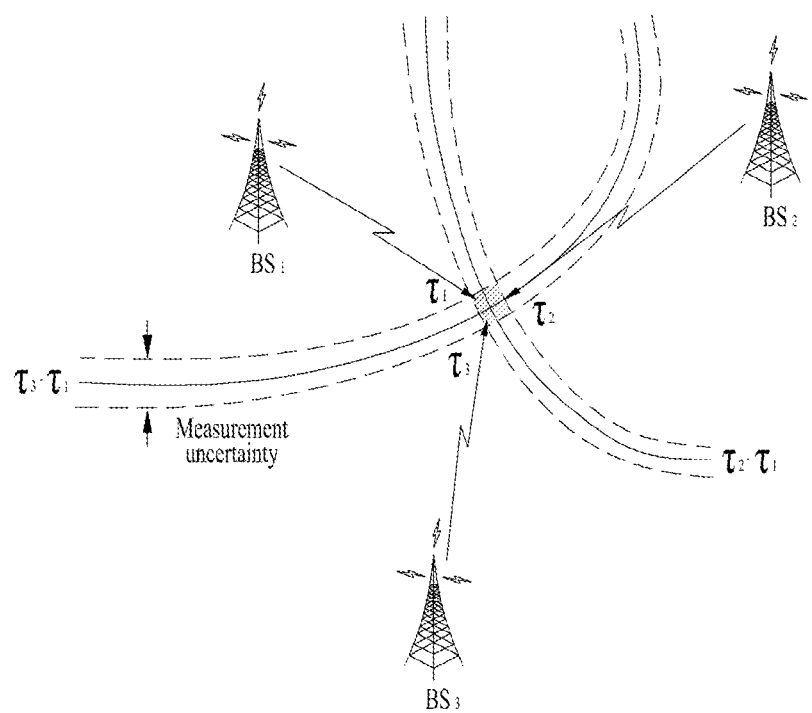
FIG. 13 is a diagram illustrating an observed time difference of arrival (OTDOA) positioning method, to which various embodiments are applicable.

FIG. 13 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 5]

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and IL and $n_i$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

$T_{ADV}$ Type 1=(ng-eNB Rx-Tx time difference)+(UE E-UTRA Rx-Tx time difference)

TADV Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 14:
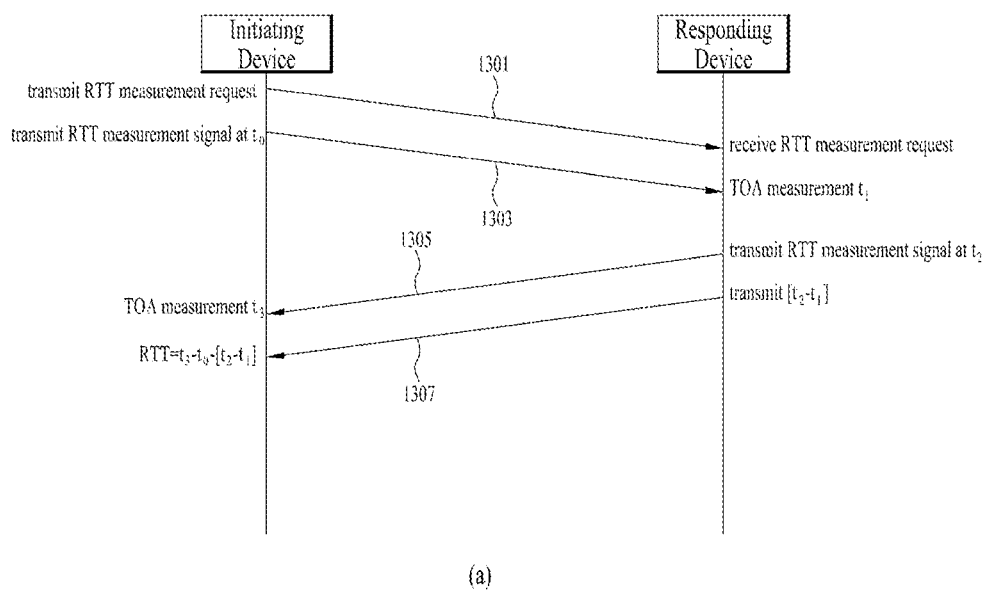
FIG. 14 is a diagram illustrating a multi-round trip time (multi-RTT) positioning method to which various embodiments are applicable.
Figure 14:
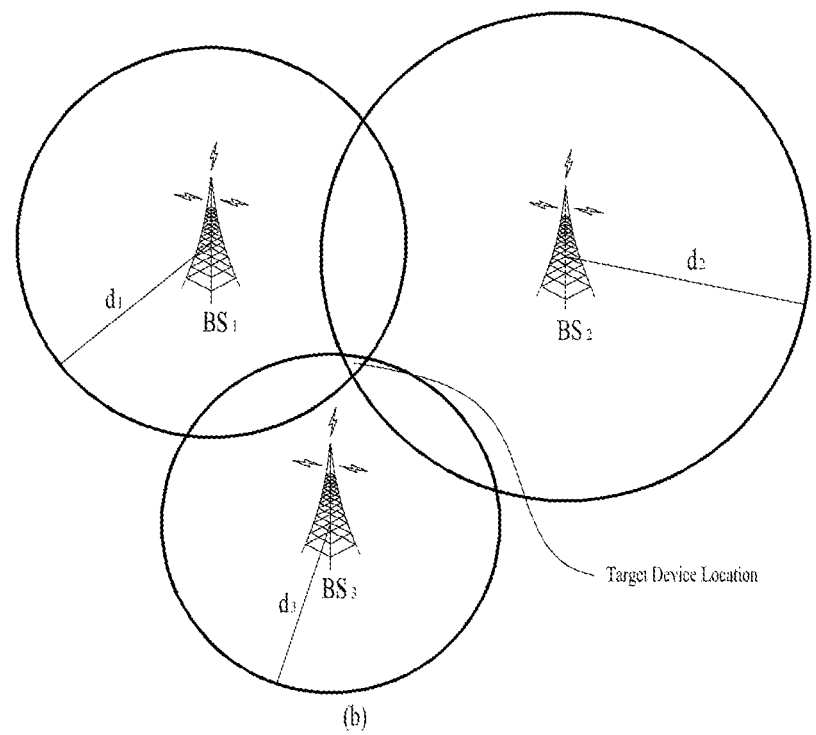

FIG. 14 is a diagram illustrating an exemplary multi-round trip time (multi-RTT) positioning method to which various embodiments are applicable.

Referring to FIG. 14(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 14(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-Resource) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 14 shows an exemplary SRS request field.

TABLE 14

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 1$^{st}$ set of serving cells configured by higher layers |
| 10 | SRS resource set(s) configured by SRS-ResourceSet with higher layer parameter aperiodicSRS- | SRS resource set(s) configured with higher layer parameter usage in SRS-ResourceSet set to 'antennaSwitching' |

TABLE 14-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 11 | ResourceTrigger set to 2 or an entry in aperodicSRS-ResourceTriggerList set to 2 SRS resource set(s) configured by SRS-PosResourceSet with an entry in aperodicSRS-ResourceTriggerList set to 2 when triggered by DCI formats 0_1, 0_2, 1_1, and 1_2 | and resourceType in SRS-ResourceSet set to 'aperiodic' for a $2^{nd}$ set of serving cells configured by higher layers |
|  | SRS resource set(s) configured by SRS-ResourceSet with higher layer parameter aperodicSRS-ResourceTrigger set to 3 or an entry in apenodicSRS-ResourceTriggerList set to 3 SRS resource set(s) configured by SRS-PosResourceSet with an entry in aperodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

In Table 14 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
CA: carrier aggregation
DC: dual connectivity
CSI-RS: channel state information reference signal
LMF: location management function
PRS: positioning reference signal
RS: reference signal
SRS: sounding reference signal. According to various embodiments, the SRS may be used for UL channel estimation using multi input multi output (MIMO) and positioning measurement. In other words, according to various embodiments, the SRS may include a normal SRS and a positioning SRS. According to various embodiments, the positioning SRS may be understood as a UL RS that is configured for positioning of the UE and/or used for positioning of the UE. According to various embodiments, the normal SRS may be compared with the positioning SRS and may be understood as a UL RS that is configured for UL channel estimation and/or used to for UL channel estimation (and/or configured for UL channel estimation and positioning and/or used for UL channel estimation and positioning). According to various embodiments, the positioning SRS may also be referred to as an SRS for positioning, etc. In the description of various embodiments, terms such as the positioning SRS and the SRS for positioning may be used interchangeably and may be understood to have the same meaning. According to various embodiments, the normal SRS may also be referred to as a legacy SRS, a MIMO SRS, an SRS for MIMO, or the like. In the description of various embodiments, terms such as the normal SRS, the legacy SRS, the MIMO SRS, and the SRS for MIMO may be used interchangeably and may be understood to have the same meaning. For example, the normal SRS and the positioning SRS may be configured/indicated separately. For example, the normal SRS and the positioning SRS may be configured/indicated from different information elements (IEs) of a higher layer. For example, the normal SRS may be configured based on an SRS-resource. For example, the positioning SRS may be configured based on SRS-PosResource.

SS: synchronization signal
SSB: synchronization signal block
SS/PBCH: synchronization signal/physical broadcast channel
TRP: transmission and reception point (TP: transmission point)

In the description of various embodiments, a BS may be understood as a comprehensive term including a remote radio head (RRH), an eNB, a gNB, a TP, a reception point (RP), a relay, and the like.

Unless otherwise specifically stated (e.g., when referred to as a default operation, etc.), an operation of a UE according to various embodiments may be configured/indicated from a BS/location server/LMF.

In the description of various embodiments, the expression 'greater than/above A' may be replaced with the expression 'above/greater than A'.

In the description of various embodiments, the expression 'less than/below B' may be replaced with the expression 'below/less than B'.

For example, when two or more UL carriers are used in a single cell and/or an SRS is transmitted for positioning of a UE in a CA operation, other UL channels such as a PUSCH/PUCCH/PRACH/(another) SRS are transmitted in different carriers at the same time, there may be a problem in terms of allocation of transmit power due to limited transmit power of the UE, and accordingly, prioritization for power reduction may be required.

For example, in an intra-band and/or inter-band CA situation (and/or DC situation), the UE may be configured/indicated to transmit an SRS and other UL signals such as a PUSCH/PUCCH/PRACH/(another) SRS in a plurality of carriers at the same time (e.g., transmit them in the same symbol). For example, a power reduction rule may be required in a CA/DC scenario for the positioning SRS.

For example, simultaneous transmission of an SRS and an SRS for positioning for MIMO in a multiple in-band component carrier (CC) and/or a given band combination (BC) may be supported. For example, when the UE simultaneously transmits two SRS resources for MIMO and positioning, total terminal transmit power may exceed available maximum power. Accordingly, a power limitation rule and/or a transmit prioritization for power reduction rule may be required in a CA/DC scenario.

For example, in a wireless communication system to which various embodiments are applicable (e.g., an NR system, hereinafter, the NR system will be described as an example), a carrier may be located anywhere in a spectrum. However, in the specification on a physical layer of the NR system, information on a frequency position of the carrier may not be separately described, but certain restrictions for simplification in terms of practically radio frequency (RF) implementation may be introduced. For example, in the case of an LTE system, a carrier raster of 100 kHz may be supported for this purpose. For example, in the case of an NR system, a raster may be configured differently according to a carrier frequency. For example, a raster of 5 kHz, 15 kHz, and 60 kHz may be used for a frequency of 3 GHz, 3-24.25 GHz, and/or above 24.25 GHz, respectively. For example, each value may be related to subcarrier spacing (SCS) according to each frequency band, and compatibility with a raster of 100 kHz in an LTE system may be considered in a frequency below 3 GHz.

For example, in the LTE system, a raster may be used to determine a frequency location as a part of an initial access procedure. On the other hand, for example, in the NR system, compared to the LTE system, a wider carrier and/or a larger number of bandwidth part (BWP) (and/or according to the BWP introduction) needs to be searched, and thus the corresponding raster value is used, a delay may occur in terms of latency. Therefore, for example, in the NR system, a raster used in an initial access phase, that is, a synchronization raster may be set separately, and an interval of the synchronization raster may be set wider than a carrier raster.

For example, CA may be supported in an NR system. For example, in the NR system, a maximum of 16 carriers may be aggregated and transmitted. For example, the carrier may be understood as a cell and/or may include a cell. For example, a UE that supports CA may communicate with a plurality of cells. For example, a cell that the UE initially searches for may be a Primary Cell (PCell). For example, one and/or plural cells that are indicated/configured after the UE is in a radio resource control (RRC) connected state may be a secondary cell (SCell). For example, the SCell may be activated/deactivated according to data traffic and may be configured differently for each UE. For example, the number of DL/UL between cells may be the same or different and may not be the same. This may be because, when DL traffic is relatively more than UL traffic and DL cells are combined, RF complexity is smaller than combining UL cells. For example, in the case of control signaling, due to an asymmetric CA environment, hybrid automatic repeat request (HARQ) feedback related to multiple DL links may be overloaded when transmitted from a single PCell to a PUCCH, and accordingly, a PUCCH group may be configured to divide and transmit information of the corresponding PUCCH. For example, in the case of a wireless communication system supporting the Release-16 technical specification (TS) standard technology, up to two groups may be configured. For example, in PUCCH group #0, HARQ information of related groups may be transmitted in the PCell, and in PUCCH group #1, the HARQ information may be transmitted in a primary second cell (PSCell).

For more specific details of CA to which various embodiments are applicable, refer to the CA-related description described above in Section 1.3.

Various embodiments may be related to a prioritization rule of the SRS for positioning. For example, the various embodiments may be related to a prioritization rule related to transmit power, which is applicable to the case in which, in a CA/DC scenario, a UE attempts to transmit a (positioning) SRS in a specific carrier and transmits UL signals (PRACH/PUCCH/PUSCH/SRS (another SRS that is not a positioning SRS)) in different carriers at the same time, and the case in which the maximum transmit power to be used by the UE is overloaded at the same time (when total transmit power for all UL signals exceeds the maximum transmit power of the UE).

Figure 15:
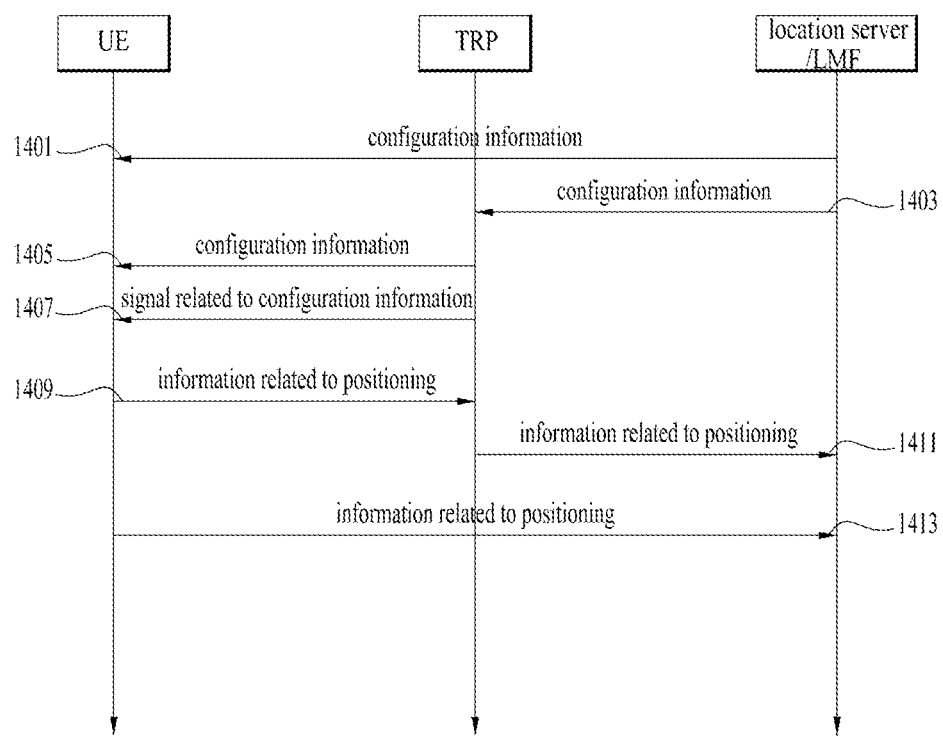
FIG. 15 is a simplified diagram illustrating a method of operating a UE, a transmission and reception point (TRP), a location server, and/or a location management function (LMF) according to various embodiments.

FIG. 15 is a simplified diagram illustrating an operating method of a UE, a TRP, a location server, and/or an LMF according to various embodiments.

Referring to FIG. 15, in operation 1501 according to various embodiments, the location server and/or the LMF may transmit configuration indicated to the UE and the UE may receive the configuration information.

In operation 1503 according to various embodiments, the location server and/or the LMF may transmit reference configuration information to the TRP and the TRP may receive the reference configuration information. In operation 1505 according to various embodiments, the TRP may transmit the reference configuration information to the UE and the UE may receive the reference configuration information. In this case, operation 1501 according to various embodiments may be omitted.

In contrast, operations 1503 and 1505 according to various embodiments may be omitted. In this case, operation 1501 according to various embodiments may be performed.

That is, operation 1501 according to various embodiments, and operations 1503 and 1505 according to various embodiments may be selectively performed.

In operation 1507 according to various embodiments, the TRP may transmit a signal related to the configuration information and the UE may receive the signal related to the configuration information. For example, the signal related to the configuration information may be a signal for positioning of the UE.

In operation 1509 according to various embodiments, the UE may transmit a signal related to positioning to the TRP and the TRP may receive the signal related to positioning. In operation 1511 according to various embodiments, the TRP may transmit the signal related to positioning to the location server and/or the LMF and the location server and/or the LMF may receive the signal related to positioning.

In operation 1513 according to various embodiments, the UE may transmit the signal related to positioning to the location server and/or the LMF and the location server and/or the LMF may receive the signal related to positioning. In this case, operations 1509 and 1511 according to various embodiments may be omitted.

In contrast, operation 1513 according to various embodiments may be omitted. In this case, operations 1509 and 1511 according to various embodiments may be performed.

That is, operations 1509 and 1511 according to various embodiments, and operation 1513 according to various embodiments may be selectively performed.

According to various embodiments, the signal related to positioning may be obtained based on the configuration information and/or the signal related to the configuration information.

Figure 16:
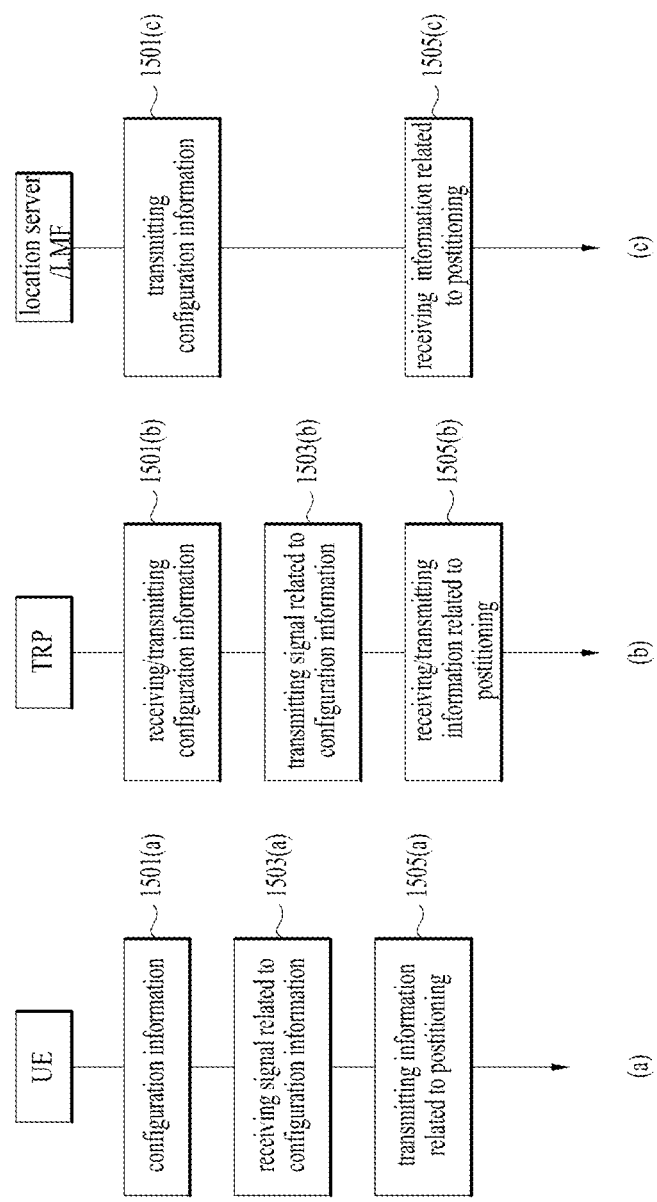
FIG. 16 is a simplified diagram illustrating a method of operating a UE, a TRP, a location server, and/or an LMF according to various embodiments.

FIG. 16 is a simplified diagram illustrating an operating method of a UE, a TRP, a location server, and/or an LMF according to various embodiments.

Referring to FIG. 16(*a*), in operation 1601(*a*) according to various embodiments, the UE may receive configuration information.

In operation 1603(*a*) according to various embodiments, the UE may receive a signal related to the configuration information.

In operation 1605(*a*) according to various embodiments, the UE may transmit information related to positioning.

Referring to FIG. 16(*b*), in operation 1601(*b*) according to various embodiments, the TRP may receive configuration information from the location server and/or the LMF and transmit the configuration information to the UE.

In operation 1603(*b*) according to various embodiments, the TRP may transmit a signal related to the configuration information.

In operation 1605(*b*) according to various embodiments, the TRP may receive information related to positioning and transmit the information related to positioning to the location server and/or the LMF.

Referring to FIG. 16(*c*), in operation 1601(*c*) according to various embodiments, the location server and/or the LMF may transmit configuration information.

In operation 1605(*c*) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Scenario 1: Comparison Between PRACH/PUSCH/PUCCH/SRS

For example, since the transmit power of a UE is limited, a power priority rule for this may be required according to introduction of a positioning SRS. For example, a power priority rule may be required in relation to other UL signals (e.g., a PRACH, a PUCCH, a PUSCH, or a normal SRS). For example, in a CA/DC situation, when a positioning SRS and a different UL signal are simultaneously transmitted in different carriers, such power allocation may be problematic.

According to various embodiments, for the case in which the UE needs to (simultaneously) transmit a PRACH and/or a PUCCH and/or a PUSCH and/or an SRS (including a normal SRS and/or a positioning SRS) through multiple carriers in a CA/DC situation, a UL signal prioritized when the maximum transmit power of the UE needs to be considered may be determined/defined.

According to various embodiments, there may be a method of allocating power to corresponding UL signals with a fixed (predefined/configured) priority and a method in which a BS/location server/LMF dynamically transmits information on the corresponding values (related to a priority) and a UE allocates transmit power by dynamically applying a prioritization rule based on information to be received/transferred. The respective methods according to various embodiments are not mutually contradictory, and each method may constitute a separate embodiment and/or two methods may be combined to constitute another embodiment.

According to various embodiments, transmit power may be allocated in descending order from UL transmission of a high priority to a UL transmission of a low priority according to a determined priority.

Method 1: Allocation of Different Priorities for Respective UL Signals

According to various embodiments, a PRACH may be configured/defined with the (highest) priority. This may be considered related to the following, and for example, when initial access or initial attach, handover, beam failure recovery, RRC connection re-establishment, UE-triggered UL data transmission, and UL synchronization are "non-synchronized", a PRACH is transmitted from a UE for reasons such as DL and/or UL data arrival during RRC_CONNECTED, transition from RRC_INACTIVE, time alignment establishment in SCell addition, and a request of other system information (OSI) and is directly related to a link between the UE and the BS.

According to various embodiments, after a (PRACH), a PUCCH may be configured/defined to the next higher priority. This, for example, may be considered that the PUCCH is capable of being transmitted without a separate resource setting in the BS and transmitted before data transmission of the UE.

As in the above-mentioned example, according to various embodiments, differential and/or the same priority may be configured/defined for reasons such as consideration of unique characteristics and/or reliability ensuring of each UL signal.

Alt.1: Default Configuration

According to Alternative 1 of various embodiments, a rule commonly applied to all cells may be determined without a separate indicator and/or information.

According to various embodiments, a PRACH may have the highest priority (high priority), and may then have priority in a PUCCH, a PUSCH (or a PUSCH, PUCCH), and an SRS in the order. According to various embodiments, compared with other UL signals, an SRS signal may be considered to the lowest priority.

For example, if power as much as the maximum transmit power of the UE is required for PRACH transmission, the UE may not transmit a designated/configured PUCCH, PUSCH, and SRS at the same time. That is, for example, the UE may allocate the maximum transmit power of the UE to PRACH transmission, and may not allocate transmit power to the remaining PUCCH, PUSCH, and SRS transmission, and/or may allocate transmit power of 0 thereto.

According to various embodiments, when UL signals are transmitted through a plurality of carriers at the same time, available power may be allocated and transmitted from a signal with the highest priority, and an insufficient amount of power may be allocated to a signal that does not have enough power for transmission, and the signal may be transmitted and/or not transmitted. For example, assuming that the maximum transmit power to be used by the UE is 5 dBm, and each of transmit power required for PRACH transmission and transmit power required for PUCCH transmission are 3 dBm, the UE may allocate power of 3 dBm for PRACH transmission to transmit the PRACH, and may allocate 2 dBm (and/or power of 2 dBm or less) for PUCCH transmission to transmit the PUCCH and/or not to transmit the PUCCH (and/or to cancel/drop PUCCH transmission).

In another example, assuming that the maximum transmit power to be used by the UE is 7 dBm and each of transmit power required for PRACH transmission, transmit power required for PUCCH transmission, and transmit power required for SRS transmission is 4 dBm, the UE may allocate power of 4 dBm to PRACH transmission and may transmit the PRACH. For example, the UE may allocate the remaining power of 3 dBm (and/or 3 dBm or less) and may transmit the PUCCH, may not transmit the SRS, and/or may not transmit both the PUCCH and the SRS. And/or, for example, the UE may allocate a higher transmit power than the SRS to a PUCCH having a higher priority within 3 dBm and may allocate a lower transmit power than the PUCCH to the SRS to transmit both the PUCCH and the SRS.

According to various embodiments, a priority between SRSs, for example, a priority between a positioning SRS and a normal SRS may be provided.

According to various embodiments, a priority of the normal SRS may be higher than the priority of the positioning SRS. This may correspond to, for example, a case in which normal SRS is more important than a positioning RS for smooth UL data scheduling and/or UL channel estimation.

On the other hand, according to various embodiments, a priority of the positioning RS may be equivalent to and/or higher than a priority of another UL channel (e.g., a PRACH, a PUCCH, a PUSCH, (and/or a normal SRS), etc.). This may correspond to, for example, a case in which the positioning SRS needs to be transmitted for a special situation. For example, when UE positioning needs to be prioritized according to necessity in a wireless network, the priority of the positioning RS may be greater than or equal to the priority of other UL channel transmission. For example, as an emergency situation such as disasters/damages/disappearances occurs and/or rescue requests due to emergency situations occurs, the case in which location measurement of the UE needs to be prioritized may be an example of a special situation.

Urgent such as a rescue request due to a disaster

For example, the purpose of a random access procedure and/or PRACH transmission as described above may be one or more of the following purposes.

Network initial access from RRC IDLE
RRC connection re-establishment procedure
Handover
UE-triggered UL data transmission
When UL synchronization is "non-synchronized, DL and/or UL data arrival during RRC_CONNECTED
Transition from RRC_INACTIVE
Time alignment establishment in SCell addition
Other system information (OSI) request
Beam failure recovery For example, a priority of the PRACH transmitted for purposes other than the case where the PRACH is transmitted for requesting the OSI may always be higher than the positioning SRS. For example, a priority of PRACH transmission for requesting OSI may be less than or equal to a priority of positioning SRS transmission.

As an additional method, for example, when a special situation such as an emergency situation occurs, accurate positioning measurement may be required. In this case, for example, the positioning SRS may have a lower priority than the PRACH, but may have a higher priority than the PUCCH and/or the PUSCH. For example, when UE positioning needs to be prioritized according to necessity in a wireless network, the priority of the positioning RS may be greater than or equal to the priority of other UL channel transmission. For example, as an emergency situation such as disasters/damages/disappearances occurs and/or rescue requests due to emergency situations occurs, the case in which location measurement of the UE needs to be prioritized may be an example of a special situation.

For example, in a single carrier operation, it may not be expected that the UE is configured an overlapping symbol having the positioning SRS resource and the normal SRS resource with periodically configured resourceType.

And/or, for example, in a single carrier operation, it may not be expected that the UE is triggered to transmit an SRS in an overlapping symbol having the positioning SRS resource and the normal SRS resource. For example, the resourceType of the positioning SRS resource and the normal SRS resource may be semi-static and/or aperiodically configured.

On the other hand, for example, unlike a single carrier operation in which the normal SRS resource and the positioning RS resource are not transmitted in the same symbol, the normal SRS resource and the positioning SRS resource may be simultaneously transmitted in CA/DC. For this situation, for example, when the total UE transmission power exceeds the available maximum power, the priority of the transmit power between the positioning SRS and the normal SRS (and/or a UL signal including the same) needs to be configured/defined. According to various embodiments, (in the case of having the same time-domain behavior) the normal SRS may have a higher priority than the positioning SRS.

In more detail, according to various embodiments, for a single cell operation with two UL carriers and/or a carrier aggregation operation, when the total UE transmission power for PUSCH and/or PUCCH and/or PRACH and/or SRS transmission in serving cells within a frequency range (FR) in each transmission occasion exceeds preconfigured/predefined maximum transmit power of the UE (maximum transmit power in the transmission occasion) (and/or exceeds a linear value (e.g., $\hat{P}_{CMAX}(i)$) of configured transmit power of the UE, where the linear value of the transmit power may be the configured maximum UE output power (e.g., $P_{CMAX}(i)$) and may be predefined/preconfigured), the UE may allocate power according to the following preconfigured/predefined priority (in descending order) with respect to PUSCH and/or PUCCH and/or PRACH and/or SRS transmission. According to various embodiments, in all symbols in a transmission occasion, the total UE transmission power may be greater than or equal to the maximum transmit power of the UE. That is, according to various embodiments, through power allocation based on a priority, the UE may control the total transmission power in each symbol of the transmission occasion (i) to be less than or equal to the linear value of the configured UE transmission power. For example, to this end, the UE may be configured to scale and/or drop power for uplink transmission having a low priority.

[Priority]
PRACH transmission (e.g., PRACH transmission in PCell)
Transmission given a higher priority index among PUCCH or PUSCH transmission
For PUCCH or PUSCH transmission to which the same priority index is assigned:
  PUCCH transmission having Hybrid automatic repeat request-acknowledgement (HARQ-ACK) information and/or scheduling request (SR) and/or location report request (LRR) or PUSCH transmission having HARQ-ACK information
  PUCCH transmission having channel state information (CSI) or PUSCH transmission having CSI
  PUSCH transmission having HARQ-ACK information or CSI and PUSCH transmission (for a type-2 random access procedure or a 2-step random access procedure) (e.g., PUSCH transmission in PCell)
SRS transmission (an aperiodic SRS may be semi-static (semi-persistent) and/or may have a higher priority than an SRS) or PRACH transmission in another serving cell that is not a PCell
(In case of an SRS resource having the same resourceType (periodic/semi-static/aperiodic)) normal SRS transmission has a higher priority than positioning SRS transmission.

For example, normal SRS transmission may be SRS transmission having an SRS resource configured by an SRS-resource. For example, positioning SRS transmission may be SRS transmission having an SRS resource configured by SRS-PosResource.

According to various embodiments, the above-mentioned priority (e.g., a priority between UL signals including the normal SRS and the UL signal) may be basically applied, but if necessary, other operations/methods for changing/configuring/determining a priority between UL signals including the normal SRS and the positioning SRS may be introduced.

A more specific operation/method may follow one or more of the descriptions of various embodiments.

Alt.1.1: Prioritization Rule Between Normal SRS and Positioning SRS

According to Alternative 1 of various embodiments, a rule of configuring/defining a priority between two SRSs when both the positioning SRS and the normal SRS have a smaller priority than other UL signals (e.g., a PRACH, a PUCCH, or a PUSCH).

As described above, according to various embodiments, the normal SRS may have a higher priority than the positioning SRS. This may be considered, for example, that the normal SRS is for smooth UL data scheduling and/or UL channel estimation in the BS.

As described above, for example, the positioning SRS needs to be considered as a higher priority than the normal SRS. In another method according to various embodiments, a case in which a priority of the positioning SRS is high may be considered, and the BS may designate/indicate a priority between two SRSs through system information and/or radio resource control (RRC) signaling.

For example, basically, the normal SRS may have a higher priority than the positioning SRS, and when the positioning SRS is to be considered as a higher priority, the positioning SRS may be designated/indicated/configured to be considered as a higher priority than the normal SRS from the system information and/or RRC signaling. In another example, the priority between the normal SRS and the positioning SRS may be designated/indicated/configured from system information and/or RRC signaling.

According to various embodiments, when the normal SRS is defined/configured to have a higher priority than the positioning SRS for the same reason as described above, transmit power may be preferentially allocated to the normal SRS.

According to various embodiments, even if the normal SRS is defined/configured to have a higher priority than the positioning SRS for the same reason as described above, when a plurality of normal SRSs and a plurality of positioning SRSs are transmitted through a plurality of carriers, at least one positioning SRS may be assigned a next priority of the normal SRS to which power is allocated first. This may be, for example, for balanced transmit power allocation between the normal SRS and the positioning SRS.

And/or, according to various embodiments, the BS may also configure/indicate a proportional value for the transmit power of each of the positioning SRS and the normal SRS through system information and/or RRC information. For example, if the remaining available maximum transmit power after one or more of a PRACH, a PUCCH, and a PUSCH are transmitted is 5 dBm, the normal SRS and the positioning SRS need to be transmitted to a PCell and a SCell, respectively, and assuming that the normal SRS and the positioning SRS require transmit power of 7 dBm and 4 dBm, respectively, the UE may transmit the normal SRS by using all of power of 5 dBm remaining in the normal SRS transmission.

For example, when the normal SRS is transmitted from the PCell and one SCell and the positioning SRS is transmitted to another SCell, if the proportional value is configured to 3:2 according to the embodiment as described above, 3 dBm for normal SRS transmission of the PCell (and/or SCell) and 2 dBm for (positioning) SRS transmission of the SCell may be configured/allocated and transmitted. That is, in this case, 3 dBm of total 5 dBm power may be allocated for the normal SRS (transmitted from the PCell and/or the SCell), and the remaining 2 dBm of total 5 dBm may be allocated for the positioning SRS (transmitted from the SCell). As a converse example, when the normal SRS is transmitted in the SCell and the positioning SRS is transmitted in the PCell (and/or the SCell), if the proportional value is configured to 3:2 according to the above-described embodiment, 3 dBm for the normal SRS of the SCell and 2 dBm for the positioning SRS of the PCell (and/or the SCell) may also be allocated.

Alt.1.2: Prioritization Rule for Positioning SRS Considering Cell Coverage

According to various embodiments, a priority may be considered according to spatial relation information of the positioning SRS.

For example, the UE may be configured/indicated from the BS/server/LMF to transmit the positioning SRS to a geographically nearby (physical) (serving) cell/BS/TRP and/or may be configured/indicated from the BS/server/LMF to transmit the positioning SRS to a (neighbor) cell/BS/TRP far away from the UE.

For example, a close/far distance may mean a magnitude relationship between two distances and/or the distance is within/out of a certain range and/or the distance is below/above a certain threshold. For example, the distance may be identified/obtained based on pathloss of a DL RS (e.g., a PRS, a channel state information reference signal (CSI-RS), and an SSB block).

For example, when the positioning SRS is transmitted to a cell/BS/TRP that is far away, it may be considered that detection performance is degraded when transmit power is reduced.

According to various embodiments, when a DL RS configured/indicated by spatial relation information and an identifier (e.g., a physical cell identifier (PCID)) of a cell/BS/TRP to which the DL RS is transmitted is different from an identifier (e.g., a PCID) of a cell/BS/TRP to which the UE belongs, the UE may be configured with a higher priority than one or more of UL signal transmissions (PRACH and/or PUCCH and/or PUSCH (and/or normal SRS) transmission) that are simultaneously performed in a plurality of carriers with respect to positioning SRS transmission.

For example, as described above, the positioning SRS may basically have a lower priority than a PUSCH/PUCCH, but when the above-described condition is satisfied (e.g., when the above-described condition related to the identifier is satisfied), the positioning SRS may have a higher priority than the PUSCH/PUCCH.

According to various embodiments, when the spatial relation information is received and a PCID (and/or a BS/TRP ID) identified from a DL RS related to the spatial relation information is different from a PCID (and/or a BS/TRP ID) configured/allocated to the UE, a priority of the positioning SRS may be higher than one or more priorities of other UL signals (e.g., a PRACH, a PUCCH, a PUSCH, or (a normal SRS)). According to various embodiments, when the spatial relation information is not received or the PCID (and/or the BS/TRP ID) identified from the DL RS related to the spatial relation information is the same as the PCID (and/or the BS/TRP ID) configured/allocated to the UE, a default priority rule may be applied.

Alt.2: Dynamic Configuration

In Method 1 according to various embodiments, a priority rule for a UL signal that is basically applied without special signaling (e.g., system information and/or RRC signaling) may be defined, and the UE may apply this priority rule and may allocate transmit power in consideration of the (maximum) transmit power of the UE. As described above, according to various embodiments, the priority rule may be basically applied, and if necessary, other operations/methods for changing/configuring/determining a priority may be introduced.

According to various embodiments, when separate signaling related to a priority is not transmitted/received, the above-described default priority rule may be applied. According to various embodiments, when separate signaling related to the priority is transmitted/received, the signaled priority may be followed. According to various embodiments, a priority rule according to a separately signaled priority may be given priority over a default priority rule.

According to various embodiments, the BS may variably allocate a priority of a UL signal (e.g., one or more of a PRACH, a PUCCH, a PUSCH, a normal SRS, and a positioning SRS). For example, the priority may be allocated/configured/indicated through system information and/or RRC signaling. For example, when this allocation/configuration/indication is not present, the above-described predefined/configured priority is applied, but when this allocation/configuration/indication is present, the allocated/configured/indicated priority may be followed.

For example, indexing may be given for each UL signal. For example, an index may be sequentially assigned to each UL signal (via system information and/or RRC signal), and a priority may be configured/indicated. For example, a priority may be identified in descending order (and/or ascending order) of the assigned index. For example, the UL signal may be transferred via system information and/or RRC signaling in the form of PRACH (1), PUCCH (2), PUSCH (4), normal SRS (5), or positioning SRS (3). That is, for example, index #1 may be assigned to the PRACH, index #2 may be assigned to the PUCCH, index #4 may be assigned to the PUSCH, index #5 may be assigned to the normal SRS, and index #3 may be assigned to the positioning SRS, and a priority may be identified to be high (in descending order (and/or ascending order)) in the order of the corresponding index.

Alt.3: Combination Between Alt.1 and Alt.2

For example, when transmit power is unconditionally used/allocated to a UL signal according to a priority, there may be a UL signal that is not transmitted (due to lack of transmit power, etc.). For example, at least in the case of an SRS having a low priority, when a plurality of UL signals are transmitted in a plurality of carriers, the probability of not being transmitted and/or being transmitted with a low transmit power over a certain level may be relatively high.

According to various embodiments, the BS may transmit/configure information on a total transmit power allocation ratio. For example, the information on the total transmit power allocation ratio may be transmitted/received from RRC signaling and/or system information.

For example, there may be a priority between UL signals according to the above-described default priority rule, that is, sequential priority arrangement between a PRACH, a PUCCH, a PUSCH, a normal SRS, and a positioning SRS, and with respect to this, the BS may be allocated/configured/indicated with a transmit power ratio for UL signals in all UEs.

For example, the BS may transfer values of x, y, w, v, and z as a ratio value (and/or a proportional value corresponding to transmit power of each UL signal) corresponding to transmit power of each UL signal. For example, each of x, y, w, v, and z may be (zero or more) real/integer/natural number. For example, a UL signal corresponding to each of x, y, w, v, and z may be identified according to the above-described default priority rule. That is, for example, x may correspond to PRACH transmission, y may correspond to PUCCH transmission, w may correspond to PUSCH transmission, v may correspond to normal SRS transmission, and z may correspond to positioning SRS transmission.

For example, it may be assumed that 4, 3, 2, 5, and 4 are allocated to each UL signal.

For example, the UE may allocate transmit power based on 4/(4+3+2+5+4)*(total transmit power (maximum transmit power of the UE)) for the PRACH. For example, the UE may transmit the PRACH based on the transmit power separately determined based on 4/(4+3+2+5+4)*(total transmit power (maximum transmit power of the UE)).

As described above, according to various embodiments, a default priority may be applied to a UL signal/channel transmitted at the same time. In this example, assuming that UL signals are transmitted at the same time, according to the above-described default priority, the transmit power as much as a specified ratio may be added to a UL signal of a lower priority and may be transmitted, and a UL signal of the highest priority may be first allocated transmit power, and then a UE signal of the next priority may be allocated transmit power.

For example, if there is no PUSCH to be transmitted through another carrier at the same time, the UE may be additionally allocated power for PRACH transmission corresponding to 2/(4+3+2+5+4)*((total transmit power (maximum transmit power of the UE)) to be additionally allocated to the PUSCH in addition to 4/(4+3+2+5+4)*(total transmit power (maximum transmit power of the UE)) for the PRACH in the above example. For example, if the additional amount of transmit power is no longer needed (for example, after PRACH transmission is complete), the remaining amount of power may be used in UL signal transmission of a lower priority than PUCCH transmission.

Method 2: Apply Same Priority Rule

In Method 2 according to various embodiments, the UE may be allocated the same (maximum) transmit power for UL signals transmitted in a plurality of carriers at the same time. For example, considering that power required in each UL signal transmission is different, a value obtained by dividing the remaining power except for the sum of transmit power required in each UL signal transmission from the maximum transmit power to be used by the UE with the number of carriers in which UL signals are transmitted at the same may be allocated/used in each UL transmission.

Figure 17:
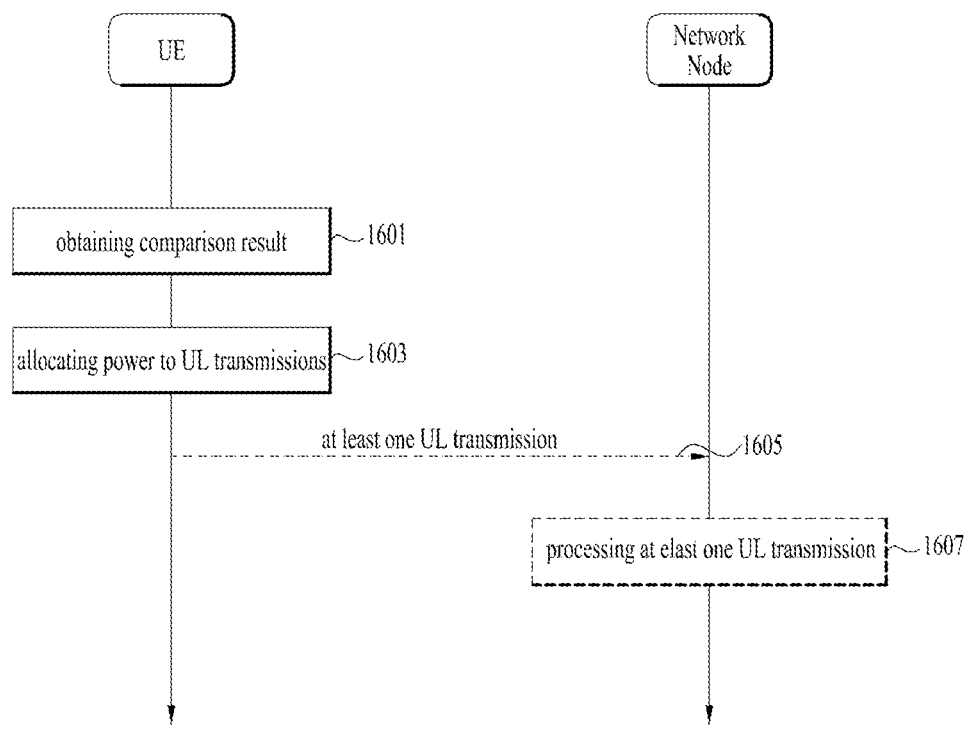
FIG. 17 is a diagram schematically illustrating a method of operating a UE and a network node according to various embodiments.

FIG. 17 is a diagram schematically illustrating a method of operating a UE and a network node according to various embodiments.

Figure 18:
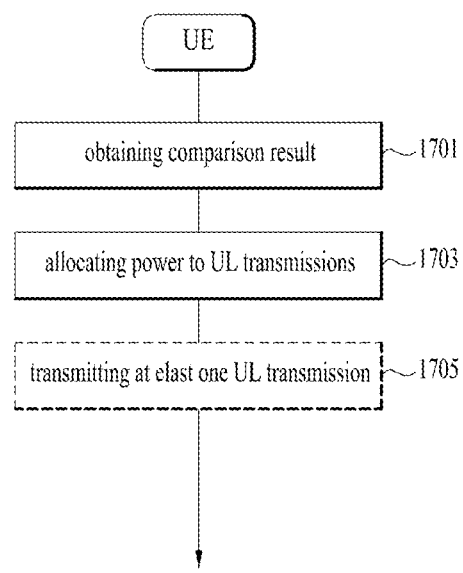
FIG. 18 is a flowchart illustrating a method of operating a UE according to various embodiments.

FIG. 18 is a flowchart illustrating a method of operating a UE according to various embodiments.

Figure 19:
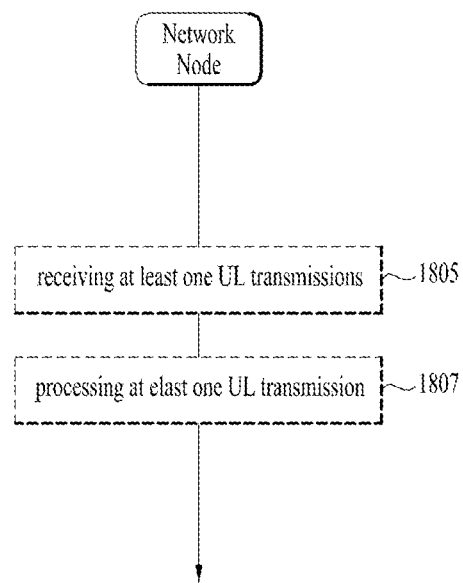
FIG. 19 is a flowchart illustrating a method of operating a network node according to various embodiments.

FIG. 19 is a flowchart illustrating a method of operating a network node according to various embodiments. For example, the network node may be a TP, a BS, a cell, a location server, an LMF, and/or any device performing the same work.

Referring to FIGS. 17 to 19, in operations 1701 and 1801 according to various embodiments, the UE may obtain a comparison result between total transmit power of UL transmissions and maximum transmit power preconfigured for the UE.

In operations 1703 and 1803 according to various embodiments, the UE may allocate power to UL transmissions according to a first predefined priority based on the comparison result.

In operations 1705, 1805, and 1905 according to various embodiments, the UE may transmit at least one UL transmission based on the allocated power, and a network node may receive this.

In operations 1707 and 1907 according to various embodiments, the BS may process at least one UL transmission. For example, information/data included in at least one UL transmission may be acquired/identified based on that one or more UL transmission is processed.

Each operation according to various embodiments may not be essential. For example, one or more of operations 1705, 1805, 1905, 1707, and 1907 according to various embodiments may be omitted.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to which Various Embodiments are Applied FIG. 20 is a diagram illustrating a device that implements various embodiments.

Figure 20:
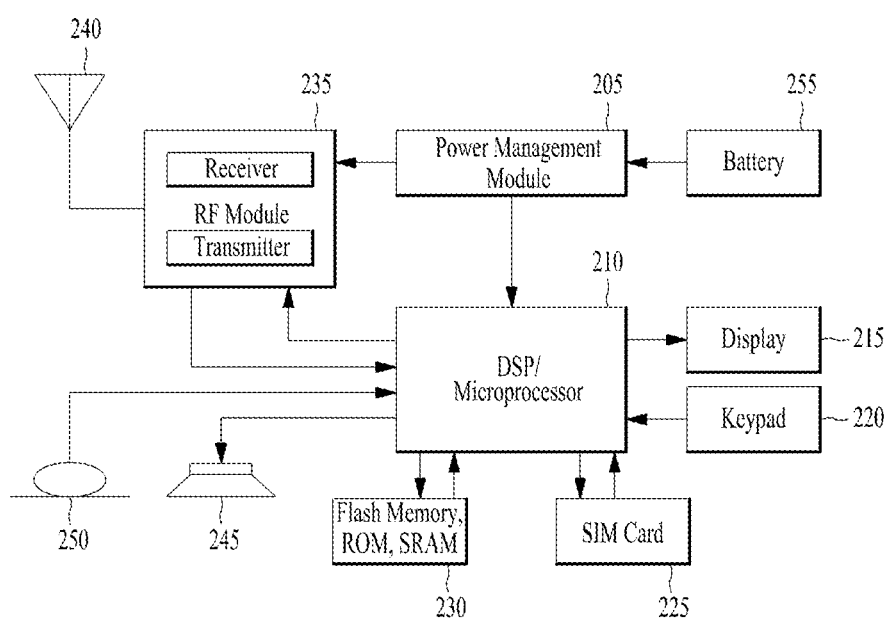
FIG. 20 is a block diagram illustrating an apparatus for implementing various embodiments.
Figure 21:
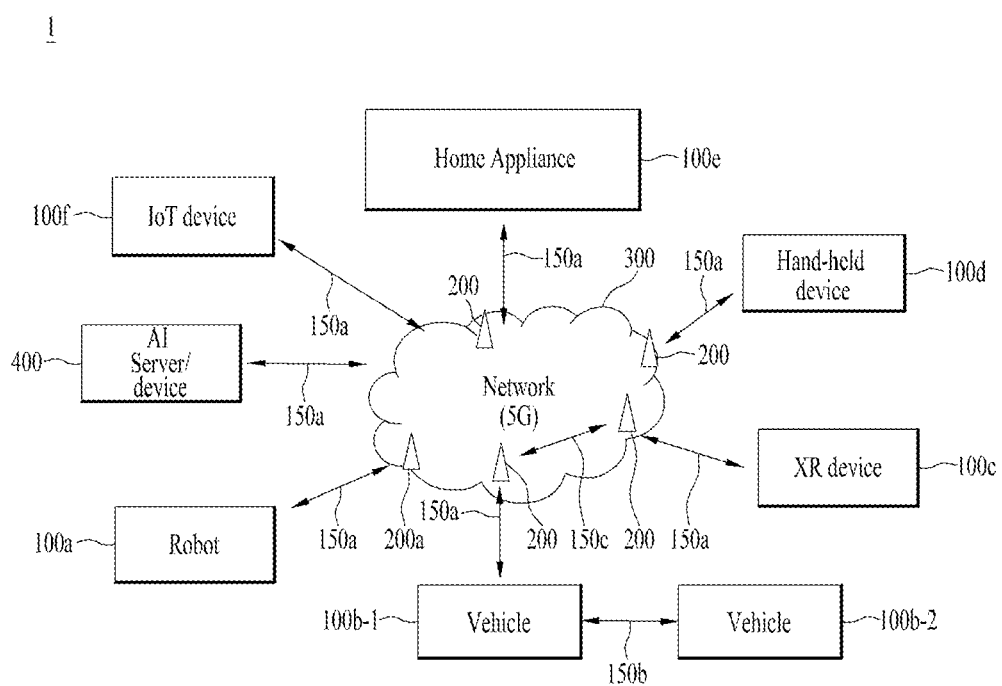
FIG. 21 is an exemplary communication system to which various embodiments are applied.
Figure 22:
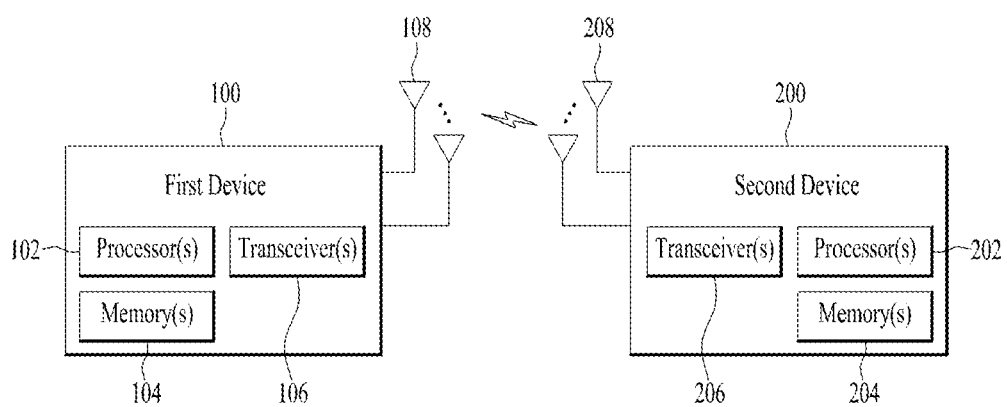
FIG. 22 illustrates exemplary wireless devices to which various embodiments are applicable.

The device illustrated in FIG. 20 may be a UE and/or a BS (e.g., eNB or gNB or TP) and/or a location server (or LMF) which is adapted to perform the above-described mechanism, or any device performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, at least one processor included in the UE (or at least one processor of a communication device included in the UE) may obtain a comparison result between total transmit power of uplink (UL) transmissions and maximum transmit power of the UE.

According to various embodiments, at least one processor included in the UE may allocate transmit power to the UL transmissions according to a first predefined priority based on the comparison result.

According to various embodiments, the UL transmissions may include normal sounding reference signal (SRS) transmission and positioning SRS transmission.

According to various embodiments, in the first priority, a priority of the normal SRS transmission may be higher than a priority of the positioning SRS transmission.

According to various embodiments, at least one processor included in the UE may allocate transmit power to the UL transmissions according to a second priority for allocation of the transmit power based on that information on the second priority is received.

According to various embodiments, allocation of the transmit power to the UL transmission according to the first priority may be performed based on that information on the second priority is not received.

According to various embodiments, the information on the second priority may include information for sequentially allocating an index to the UL transmissions according to the second priority.

According to various embodiments, the allocation of the transmit power to the UL transmission according to the first priority may include allocating maximum transmit power of the UE as transmit power of each of the UL transmissions according to a transmit power allocation ratio for each of the UL transmissions, determined based on a plurality of power ratio values for allocation of the transmit power and a power value related to each of the UL transmissions, based on that information on the plurality of power ratio values are received.

According to various embodiments, each of the plurality of power ratio values may be related to a different one of the UL transmissions identified based on the first priority among the UL transmissions.

According to various embodiments, based on that (i) spatial relation information is received and (ii) a physical cell identifier (PCID) identified from a downlink (DL) reference signal (RS) related to the spatial relation information is different from a PCID configured in the UE, a priority of the positioning SRS transmission may be higher than a priority of at least one UL transmission among the remaining UL transmissions except for the positioning SRS transmission among the UL transmissions.

According to various embodiments, the allocation of the transmit power to the UL transmission according to the first priority may be performed based on that (i) the spatial relation information is not received and (ii) the PCID identified from the DL RS is the same as the PCID configured in the UE.

According to various embodiments, the normal SRS transmission may be mapped to a first carrier in a frequency domain.

According to various embodiments, the positioning SRS may be mapped to a second carrier different from the first carrier in the frequency domain.

According to various embodiments, the normal SRS transmission and the positioning SRS transmission may be mapped within the same time interval in a time domain.

According to various embodiments, based on that the normal SRS transmission and the positioning SRS transmission are configured as the same resource type, a priority of the normal SRS transmission may be higher than a priority of the positioning SRS transmission in the first priority.

According to various embodiments, the resource type may be one of aperiodic transmission, semi-static transmission, or periodic transmission.

According to various embodiments, at least one processor included in a network node (or at least one processor of a communication device included in the network node) may receive at least one UL transmission among uplink (UL) transmissions from the UE.

According to various embodiments, at least one processor included in a network node may process the at least one UL transmission.

According to various embodiments, transmission power of the at least one UL transmission may be determined as transmit power is allocated to the UL transmissions according to a first predefined priority based on a comparison result between total transmit power of the UL transmissions and maximum transmit power of the UE.

According to various embodiments, the UL transmissions may include normal sounding reference signal (SRS) transmission and positioning SRS transmission.

According to various embodiments, in the first priority, a priority of the normal SRS transmission may be higher than a priority of the positioning SRS transmission.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied

Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
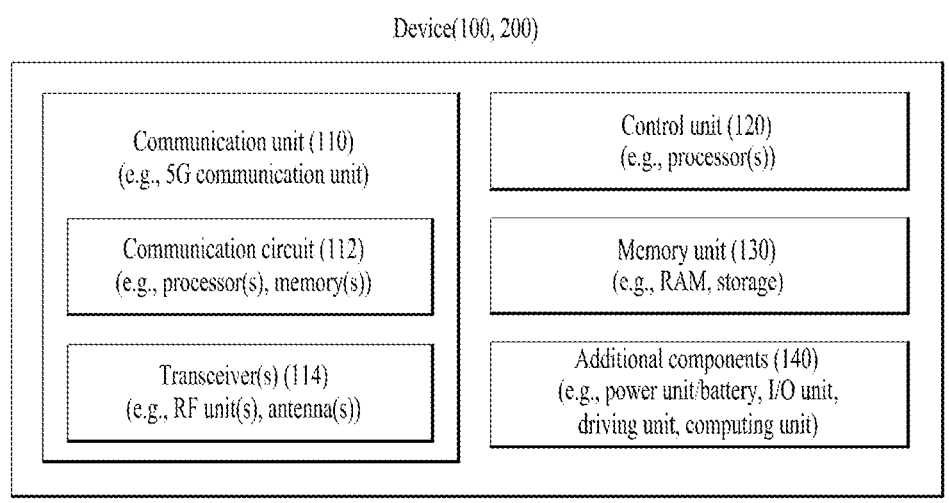
FIG. 23 illustrates other exemplary wireless devices to which various embodiments are applied.

FIG. 23 illustrates an exemplary communication system to which various embodiments are applied.

Referring to FIG. 23, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 24:
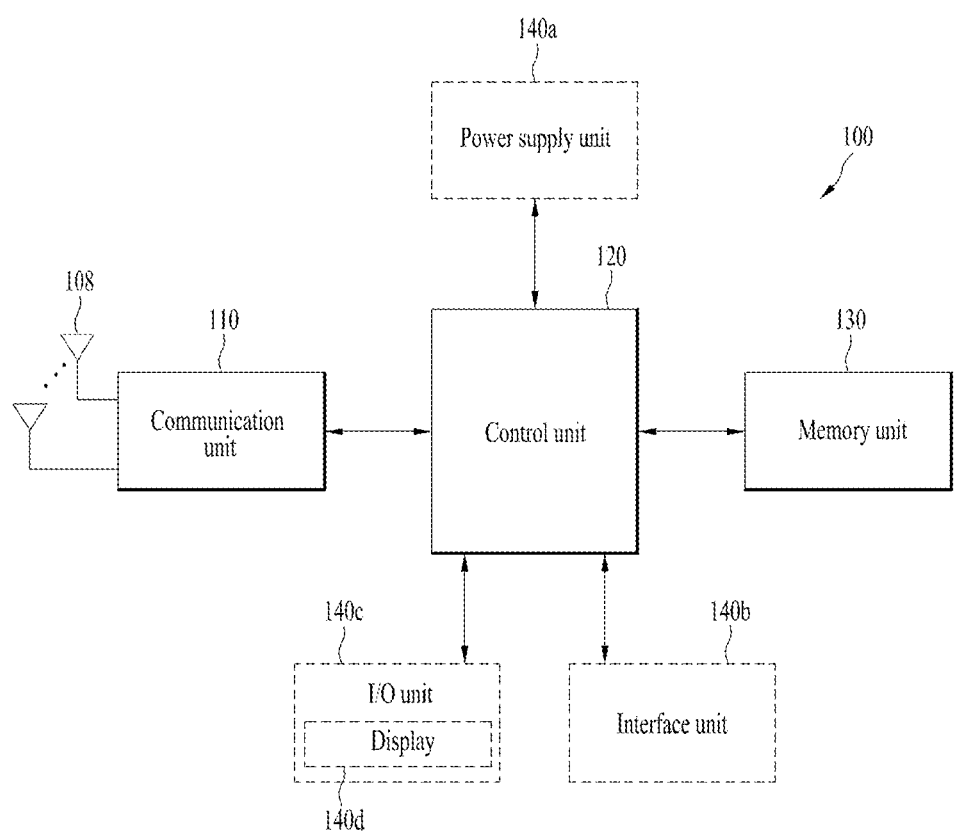
FIG. 24 illustrates an exemplary portable device to which various embodiments are applied.

FIG. 24 illustrates exemplary wireless devices to which various embodiments are applicable.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include at least one processor 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include at least one processor 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, at least one processor 102 and 202. For example, the at least one processor 102 and 202 may implement one or more layers (e.g., functional layers such as PHY, MAC, RLC, PDCP, RRC, and SDAP). The at least one processor 102 and 202 may generate one or more Protocol Data Units (PDUs) and/or one or more Service Data Unit (SDUs) according to the descriptions, functions, procedures, proposals, methods, and/or operational flowcharts disclosed in this document. The at least one processor 102 and 202 may generate messages, control information, data, or information according to the descriptions, functions, procedures, proposals, methods, and/or operational flowcharts disclosed in this document. The at least one processor 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The at least one processor 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The at least one processor 102 and 202 may be referred to as controllers, microcontrollers, microprocessors, or microcomputers. The at least one processor 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the at least one processor 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the at least one processor 102 and 202 or stored in the one or more memories 104 and 204 so as to be driven by the at least one processor 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the at least one processor 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the at least one processor 102 and 202. The one or more memories 104 and 204 may be connected to the at least one processor 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the at least one processor 102 and 202 and transmit and receive radio signals. For example, the at least one processor 102 and 202 may perform control so that the one or more transceivers 106 and 206 may transmit user data, control information, or radio signals to one or more other devices. The at least one processor 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the at least one processor 102 and 202. The one or more transceivers 106 and 206 may convert the user data, control information, radio signals/channels, etc. processed using the at least one processor 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause at least one processor operably coupled to the one or more memories to perform operations according to various embodiments or implementations of the present disclosure.

According to various embodiments, a computer-readable storage medium may store at least one instruction or computer programs which, when executed by at least one processor, cause the at least one processor to perform operations according to various embodiments or implementations of the present disclosure.

Figure 25:
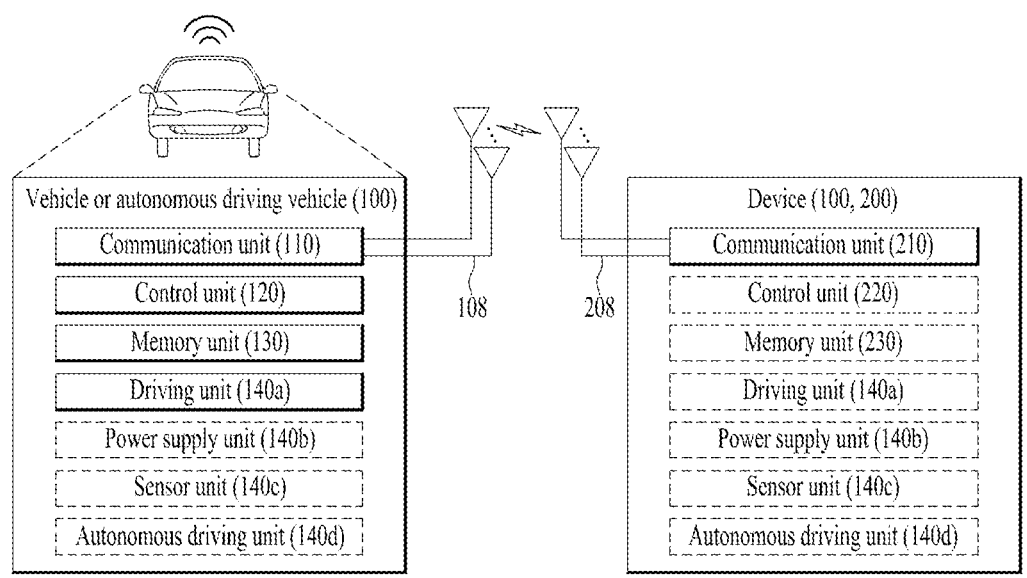
FIG. 25 illustrates an exemplary vehicle or autonomous driving vehicle to which various embodiments.

According to various embodiments, a processing device or apparatus may include at least one processor and one or more computer memories connected to the at least one processor. The one or more computer memories may store instructions or programs which, when executed, cause the at least one processor operably coupled to the one or more memories to perform operations according to various embodiments or implementations of the present disclosure.
Example of Using Wireless Devices to which Various Embodiments are Applied FIG. 25 illustrates other exemplary wireless devices to which various embodiments are applied. The wireless devices may be implemented in various forms according to a use case/service (see FIG. 23).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the at least one processor 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of at least one processor. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.
Example of Portable Device to which Various Embodiments are Applied FIG. 26 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments.

FIG. 27 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
obtaining a comparison result between a total transmit power of uplink (UL) transmissions and a maximum transmit power of the UE; and
based on the comparison result, allocating a transmit power to the UL transmissions according to a first predefined priority,
wherein the UL transmissions comprise a normal sounding reference signal (SRS) transmission and a positing SRS transmission, and
wherein, in the first predefined priority, a priority of the normal SRS transmission is higher than a priority of the positing SRS transmission.

2. The method of claim 1, further comprising:
allocating the transmit power to the UL transmissions according to the second priority based on that information on a second priority for allocating the transmit power is received,
wherein the allocating the transmit power to the UL transmissions according to the first priority is performed based on that the information on the second priority is not received.

3. The method of claim 2, wherein the information on the second priority comprises information for sequentially allocating an index to the UL transmissions according to the second priority.

4. The method of claim 1, wherein the allocating the transmit power to the UL transmissions according to the first priority comprises, based on that information on a plurality of power ratio values for allocating the transmit power is received, allocating maximum transmit power of the UE as transmit power of each of the UL transmissions according to a transmit power allocation ratio of each of the UL transmissions determined based on the plurality of power ratio values and a power value related to each of the UL transmissions, and
wherein each of the plurality of power ratio values is related to a different one of the UL transmissions identified based on the first priority among the UL transmissions.

5. The method of claim 1, wherein, based on that (i) spatial relation information is received and (ii) a physical cell identifier (PCID) identified from a downlink (DL) reference signal (RS) related to the spatial relation information is different from a PCID configured in the UE, a priority of the positioning SRS transmission is higher than a priority of at least one UL transmission among remaining UL transmissions except for the positioning SRS transmission among the UL transmissions, and
wherein the allocating the transmit power to the UL transmissions according to the first priority is performed based on that (i) the spatial relation information is not received or (ii) the PCID identified from the DL RS is the same as the PCID configured in the UE.

6. The method of claim 1, wherein the normal SRS transmission is mapped to a first carrier in a frequency domain,
wherein the positioning SRS transmission is mapped to a second carrier different from the first carrier in the frequency domain; and
wherein the normal SRS transmission and the positioning SRS transmission are mapped within the same time interval in a time domain.

7. The method of claim 1, wherein, based on that the normal SRS transmission and the positioning SRS transmission are configured as the same resource type, a priority of the normal SRS transmission is higher than a priority of the positioning SRS transmission in the first priority, and
wherein the resource type is one of aperiodic transmission, semi-static transmission, or periodic transmission.

8. A user equipment (UE) configured to operate in a wireless communication system, the UE comprising:
a transceiver; and
at least one processor coupled with the transceiver,
wherein the at least one processor is configured to:
obtain a comparison result between a total transmit power of uplink (UL) transmissions and a maximum transmit power of the UE; and
based on the comparison result, allocate a transmit power to the UL transmissions according to a first predefined priority,
wherein the UL transmissions comprise a normal sounding reference signal (SRS) transmission and a positing SRS transmission, and
wherein, in the first predefined priority, a priority of the normal SRS transmission is higher than a priority of the positing SRS transmission.

9. The UE of claim 8, wherein the at least one processor is configured to allocate the transmit power to the UL transmissions according to the second priority based on that information on a second priority for allocating the transmit power is received, and wherein the allocating the transmit power to the UL transmissions according to the first priority is performed based on that the information on the second priority is not received.

10. The UE of claim 8, wherein the normal SRS transmission is mapped to a first carrier in a frequency domain, wherein the positioning SRS transmission is mapped to a second carrier different from the first carrier in the frequency domain; and wherein the normal SRS transmission and the positioning SRS transmission are mapped within the same time interval in a time domain.

11. The UE of claim 8, wherein the at least one processor is configured to communicate with at least one of a mobile terminal, a network, and an autonomous driving vehicle other than a vehicle including the UE.

12. A method performed by a base station (BS) in a wireless communication system, the method comprising:

receiving at least one UL transmission among uplink (UL) transmissions from a user equipment (UE); and processing the at least one UL transmission, wherein, based on a comparison result between a total transmit power of the UL transmissions and a maximum transmit power of the UE, a transmit power of the at least one UL transmission is determined as a transmit power is allocated to the UL transmissions according to a first predefined priority, wherein the UL transmissions comprise a normal sounding reference signal (SRS) transmission and a positioning SRS transmission, and wherein, in the first priority, a priority of the normal SRS transmission is higher than a priority of the positioning SRS transmission.

13. A base station (BS) operating in a wireless communication system, the BS comprising:

a transceiver; and at least one processor coupled with the transceiver, wherein the at least one processor is configured to:

receive at least one UL transmission among uplink (UL) transmissions from a user equipment (UE); and process the at least one UL transmission, wherein, based on a comparison result between a total transmit power of the UL transmissions and a maximum transmit power of the UE, a transmit power of the at least one UL transmission is determined as a transmit power is allocated to the UL transmissions according to a first predefined priority, wherein the UL transmissions comprise a normal sounding reference signal (SRS) transmission and a positioning SRS transmission, and wherein, in the first priority, a priority of the normal SRS transmission is higher than a priority of the positioning SRS transmission.

\* \* \* \* \*